United States Patent
Munro et al.

(10) Patent No.: US 10,965,654 B2
(45) Date of Patent: Mar. 30, 2021

(54) CROSS-INTERFACE CORRELATION OF TRAFFIC

(71) Applicant: VIAVI Solutions Inc., San Jose, CA (US)

(72) Inventors: Andrew Munro, West Lothian (GB); Gordon Fortune, Colorado Springs, CO (US); Jun Liu, Colorado Springs, CO (US); Xiang Zhou, Colorado Springs, CO (US); Eng Wei Koo, Colorado Springs, CO (US)

(73) Assignee: VIAVI Solutions Inc., San Jose, CA (US)

( * ) Notice: Subject to any disclaimer, the term of this patent is extended or adjusted under 35 U.S.C. 154(b) by 158 days.

(21) Appl. No.: 16/035,075

(22) Filed: Jul. 13, 2018

(65) Prior Publication Data

US 2019/0166106 A1 May 30, 2019

Related U.S. Application Data

(60) Provisional application No. 62/591,490, filed on Nov. 28, 2017.

(51) Int. Cl.
*H04L 29/06* (2006.01)
*H04W 12/04* (2021.01)
(Continued)

(52) U.S. Cl.
CPC ........ *H04L 63/0471* (2013.01); *H04L 9/0894* (2013.01); *H04L 9/3242* (2013.01);
(Continued)

(58) Field of Classification Search
CPC .. H04L 63/0471; H04L 9/0894; H04L 9/3242
(Continued)

(56) References Cited

U.S. PATENT DOCUMENTS

| 7,020,701 B1 | 3/2006 | Gelvin et al. |
| 7,797,367 B1 | 9/2010 | Gelvin et al. |

(Continued)

FOREIGN PATENT DOCUMENTS

| CN | 104849731 A | 8/2015 |
| CN | 106489286 A | 3/2017 |

(Continued)

OTHER PUBLICATIONS

3GPP, "3GPP TS 38.401 3rd Generation Partnership Project; Technical Specification Group Radio Access Network; NG-RAN; Architecture description (Release 15)", www.3gpp.org/DynaReport/38401.htm, Sep. 2018, 39 pages.

(Continued)

*Primary Examiner* — Anthony D Brown
(74) *Attorney, Agent, or Firm* — Harrity & Harrity, LLP

(57) ABSTRACT

A device may monitor traffic associated with a user equipment (UE) on multiple interfaces of a network. The device may determine an identity associated with the UE or the traffic on the multiple interfaces by correlating identifiers associated with the UE or the traffic across the multiple interfaces. The identity may uniquely identify a subscriber associated with the UE or the traffic. The device may determine a set of elements to be used to decipher the traffic after determining the identity associated with the UE or the traffic. The device may decipher the traffic utilizing the set of elements after determining the set of elements.

20 Claims, 11 Drawing Sheets

(51) Int. Cl.
| | | |
|---|---|---|
| *H04W 24/08* | (2009.01) | |
| *H04L 12/26* | (2006.01) | |
| *H04L 9/08* | (2006.01) | |
| *H04L 9/32* | (2006.01) | |
| *H04L 12/851* | (2013.01) | |
| *H04W 12/06* | (2021.01) | |
| *H04W 76/12* | (2018.01) | |

(52) U.S. Cl.
CPC ............ *H04L 43/065* (2013.01); *H04L 43/08* (2013.01); *H04L 47/2483* (2013.01); *H04L 63/0876* (2013.01); *H04L 63/0892* (2013.01); *H04W 12/04* (2013.01); *H04W 12/06* (2013.01); *H04W 24/08* (2013.01); *H04L 2209/76* (2013.01); *H04L 2209/80* (2013.01); *H04W 76/12* (2018.02)

(58) Field of Classification Search
USPC ........................................................ 713/153
See application file for complete search history.

(56) References Cited

U.S. PATENT DOCUMENTS

| | | | | |
|---|---|---|---|---|
| 9,047,441 | B2 * | 6/2015 | Xie .................. | G06F 21/00 |
| 9,955,332 | B2 | 4/2018 | Raleigh et al. | |
| 10,142,276 | B2 | 11/2018 | Rapaport et al. | |
| 10,548,181 | B2 | 1/2020 | Siomina et al. | |
| 10,560,206 | B2 | 2/2020 | Inzunza et al. | |
| 2007/0135039 | A1 | 6/2007 | Yi et al. | |
| 2010/0246712 | A1 | 9/2010 | Suo et al. | |
| 2012/0155324 | A1 | 6/2012 | Janakiraman et al. | |
| 2012/0159151 | A1 | 6/2012 | Janakiraman et al. | |
| 2012/0252521 | A1 | 10/2012 | Nagaraja et al. | |
| 2013/0064279 | A1 | 3/2013 | Nielsen et al. | |
| 2013/0100830 | A1 | 4/2013 | Brady et al. | |
| 2013/0121342 | A1 | 5/2013 | Kim | |
| 2014/0080447 | A1 | 3/2014 | Janakiraman et al. | |
| 2014/0293914 | A1 | 10/2014 | Maattanen et al. | |
| 2014/0376390 | A1 | 12/2014 | Kreher et al. | |
| 2015/0006100 | A1 | 1/2015 | Jackson et al. | |
| 2015/0098352 | A1 | 4/2015 | Froehlich | |
| 2015/0181442 | A1 | 6/2015 | Zinevich | |
| 2015/0327091 | A1 | 11/2015 | Curtin et al. | |
| 2015/0358989 | A1 | 12/2015 | Ni et al. | |
| 2016/0065419 | A1 | 3/2016 | Szilagyi et al. | |
| 2016/0119796 | A1 | 4/2016 | Ho et al. | |
| 2016/0269900 | A1 * | 9/2016 | Goldfarb ............... | H04W 12/06 |
| 2016/0323754 | A1 | 11/2016 | Friday et al. | |
| 2016/0323763 | A1 | 11/2016 | Xu et al. | |
| 2016/0330641 | A1 | 11/2016 | Zhang et al. | |
| 2016/0330643 | A1 | 11/2016 | Sahin et al. | |
| 2017/0006492 | A1 | 1/2017 | Khoshnevisan et al. | |
| 2017/0064591 | A1 | 3/2017 | Padfield et al. | |
| 2017/0215221 | A1 | 7/2017 | Segev et al. | |
| 2017/0245175 | A1 | 8/2017 | Nambi et al. | |
| 2017/0347251 | A1 | 11/2017 | Kim et al. | |
| 2018/0013655 | A1 | 1/2018 | Ameixieira | |
| 2018/0115958 | A1 | 4/2018 | Raghavan et al. | |
| 2018/0213560 | A1 | 7/2018 | Naghshvar et al. | |
| 2018/0321687 | A1 | 11/2018 | Chambers et al. | |
| 2018/0359739 | A1 | 12/2018 | Boldi et al. | |
| 2019/0068512 | A1 | 2/2019 | Papaloukopoulos et al. | |
| 2019/0109810 | A1 | 4/2019 | Rapaport et al. | |
| 2019/0110335 | A1 | 4/2019 | Zhang et al. | |
| 2019/0132066 | A1 | 5/2019 | Park et al. | |
| 2019/0182800 | A1 | 6/2019 | Park et al. | |
| 2019/0268962 | A1 | 8/2019 | Wang et al. | |
| 2020/0077451 | A1 | 3/2020 | You et al. | |
| 2020/0092838 | A1 | 3/2020 | Koo | |
| 2020/0186267 | A1 | 6/2020 | Inzunza et al. | |

FOREIGN PATENT DOCUMENTS

| | | |
|---|---|---|
| EP | 2469752 A1 | 6/2012 |
| EP | 2469761 A1 | 6/2012 |
| EP | 2874449 A1 | 5/2015 |
| EP | 2945317 A1 | 11/2015 |
| EP | 3030020 A1 | 6/2016 |
| WO | 2015095846 A2 | 6/2015 |
| WO | 2016091298 A1 | 6/2016 |
| WO | 2019217723 A1 | 11/2019 |

OTHER PUBLICATIONS

3GPP, "3GPP TS 37.340 3rd Generation Partnership Project; Technical Specification Group Radio Access Network; Evolved Universal Terrestrial Radio Access (E-UTRA) and NR; Multi-connectivity; Stage 2 (Release 15)", www.3gpp.org/DynaReport/37340.htm, Sep. 2018, 59 pages.

3GPP, "Scheduling and HARQ support for NR CA", https://portal.3gpp.org/ngppapp/CreateTdoc.aspx?mode=view&contributionId=799570, Jun. 30, 2017, 4 pages.

3GPP, "On the details of CSI acquisition" http://www.3gpp.org/ftp/tsg_ran/wg1_rl1/TSGR1_AH/NR_AH_1706/Docs/, Jun. 30, 2017, 3 pages.

3GPP, "PUCCH resource allocation", http://www.3gpp.org/ftp/tsg_ran/wg1_rl1/TSGR1_AH/NR_AH_1706/Docs/, Jun. 30, 2017, 3 pages.

Sanjole, Inc., "WaveJudge 5000 LTE Analyzer", http://www.sanjole.com/our-products/lte-analyzer/, Dec. 2, 2008, 2 pages.

SGLLabs, "GenComm (JDSU), GC747A", https://www.sglabs.it/en/product.php?s=gencomm-jdsu-gc747a&id=1822, Oct. 12, 2018, 20 pages.

Wikipedia, "Drive testing", https://en.wikipedia.org/wiki/Drive_testing, Sep. 22, 2010, 3 pages.

3GPP, "Test scope for NR initial access and beam management at FR2", https://portal.3gpp.org/ngppapp/CreateTdoc.aspx?mode=view&contributionId=842909, Dec. 1, 2017, 6 pages.

VIAVI Solutions Inc., "T-BERD/MTS-5800 Handheld Network Tester", https://www.viavisolutions.com/en-us/products/t-berd-mts-5800-handheld-network-tester, Sep. 12, 2016, 5 pages.

3GPP, "3rd Generation Partnership Project; Technical Specification Group Radio Access Network; Study on eNB(s) Architecture Evolution for E-UTRAN and NG-RAN (Release 15)" https://portal.3gpp.org/desktopmodules/Specifications/SpecificationDetails.aspx?specificationId=3365, Mar. 2018, 15 pages.

3GPP, "3rd Generation Partnership Project; Technical Specification Group Radio Access Network; NR; Radio Resource Control (RRC) protocol specification (Release 15)" https://portal.3gpp.org/desktopmodules/Specifications/SpecificationDetails.aspx?specificationId=3197, Sep. 2018, 445 pages.

3GPP, "3rd Generation Partnership Project; Technical Specification Group Radio Access Network; Study on New Radio Access Technology; Radio Interface Protocol Aspects (Release 14)" https://portal.3gpp.org/desktopmodules/Specifications/SpecificationDetails.aspx?specificationId=3070, Mar. 2017, 57 pages.

3GPP, "Clarification on desired buffer size", https://portal.3gpp.org/ngppapp/CreateTdoc.aspx?mode=view&contributionId=845969, Dec. 1, 2017, 6 pages.

Rohde & Schwarz, "R&S® TSME6 Ultracompact Drive Test Scanner; All bands, all technologies, simultaneously, future-proof upgradability" https://cdn.rohde-schwarz.com/pws/dl_downloads/dl_common_library/dl_brochures_and_datasheets/pdf_1/service_support_30/TSME6_bro_en_3607-6873-12_v0201.pdf, Jun. 28, 2018, 16 pages.

Extended European Search Report for Application No. EP18211705.1, dated Apr. 11, 2019, 12 pages.

3GPP, "3rd Generation Partnership Project; Technical Specification Group Radio Access Network; Evolved Universal Terrestrial Radio Access Network (E-UTRAN); X2 application protocol (X2AP) (Release 15)," https://portal.3gpp.org/desktopmodules/specifications/specificationsDetails.aspx?specificationsid=2452, Sep. 2018, 401 pages.

(56) References Cited

OTHER PUBLICATIONS

Extended European Search Report for Application No. EP18208725.4, dated Jan. 31, 2019, 9 pages.
GSM Association, "Mobile World Congress Americas 2017, San Francisco," https://www.gsma.com/futurenetworks/events-and-webinars/mwc-americans-san-francisco/,Sep. 12, 2017, 9 pages.
Rohde & Schwarz, "Signal & Spectrum Analyzers," https://www.youtube.com/playlist?list=PLKxVoO5jUTIsxZXja8m6AH-02pBvHdGrE, Oct. 10, 2018, 10 pages.
Rohde & Schwarz, "Network Analyzers," https://www.youtube.com/playlist?list=PLKxVoO5jUTIV9g-mf65Rj7v8uQ0F9TwW, Mar. 19, 2018, 7 pages.
Sibila A., "5G: Initial 5GTF Coverage Measurements (part 2)," https://blog.mobile-network-testing.com/market-technology-trends/evolving-technologies/5g-coverage-measurements/, Jun. 12, 2018, 6 pages.
Sibila A., et al., "5G NR Network Deployment is Now—Let's Test!," Oct. 2018, 59 pages.
VIA VI Solutions Inc., "AriesoGEO," https://www.viasolutions.com/en-us/product-family/ariesogeo, Nov. 24, 2015, 8 pages.
VIA VI Solutions Inc., "CellAdvisor," https://www.viasolutions.com/en-us/product-family/celladvisor, Jun. 19, 2016, 9 pages.
VIA VI Solutions Inc., "Get geo-located, App-Aware Insight," https://www.viavisolutions.com/en-us/solutions-time-intelligence/nitro/nitro-mobile, Feb. 2018, 4 pages.
VIA VI Solutions Inc., "xSIGHT," https://www.viasolutions.com/en-us/product-family-xsight, May 17, 2014, 5 pages.
3GPP, "3rd Generation Partnership Project; Technical Specification Group Services and System Aspects; Study of Enablers for Network Automation for 5G; (Release 16)", 3GPP Standard, Technical Report, 3GPP TR 23.791, 3rd Generation Partnership Project (3GPP), France, vol. SA WG2 (V0.3.0), May 2, 2018, pp. 1-19, XP051451264, pp. 1-16, [retrieved on May 2, 2018].
3GPP, "3rd Generation Partnership Project; Technical Specification Group Services and System Aspects; Study on Cellular IoT support and evolution for the 5G System (Release 16)", 3GPP Standard, Technical Report, 3GPP TR 23.724, 3rd Generation Partnership Project (3GPP), Mobile Competence Centre, 650, Route Des Lucioles, F-06921 Sophia-Antipolis Cedex, France, vol. SA WG2 (V0.3.0), May 2, 2018, pp. 1-154, pp. 86-89, XP051451260, [retrieved on May 2, 2018].
International Search Report and Written Opinion for the Application No. PCT/US2019/031581, dated Oct. 1, 2019, 15 pages.
ETSI, "Digital cellular telecommunications system (Phase 2+)", https://www.etsi.org/deliver/etsi_ts/133400_133499/133401/08.02.01_60/ts_133401v080201p.pdf, Jan. 2009, 60 pages.
Telecomsource, "LTE Security Architecture", http://www.telecomsource.net/entry.php?6588-LTE-Security-Architecture&styleid=12. Retrieved Jul. 12, 2018, 3 pages.
Extended European Search Report for Application No. EP19197415.3, dated Feb. 13, 2020, 17 pages.

* cited by examiner

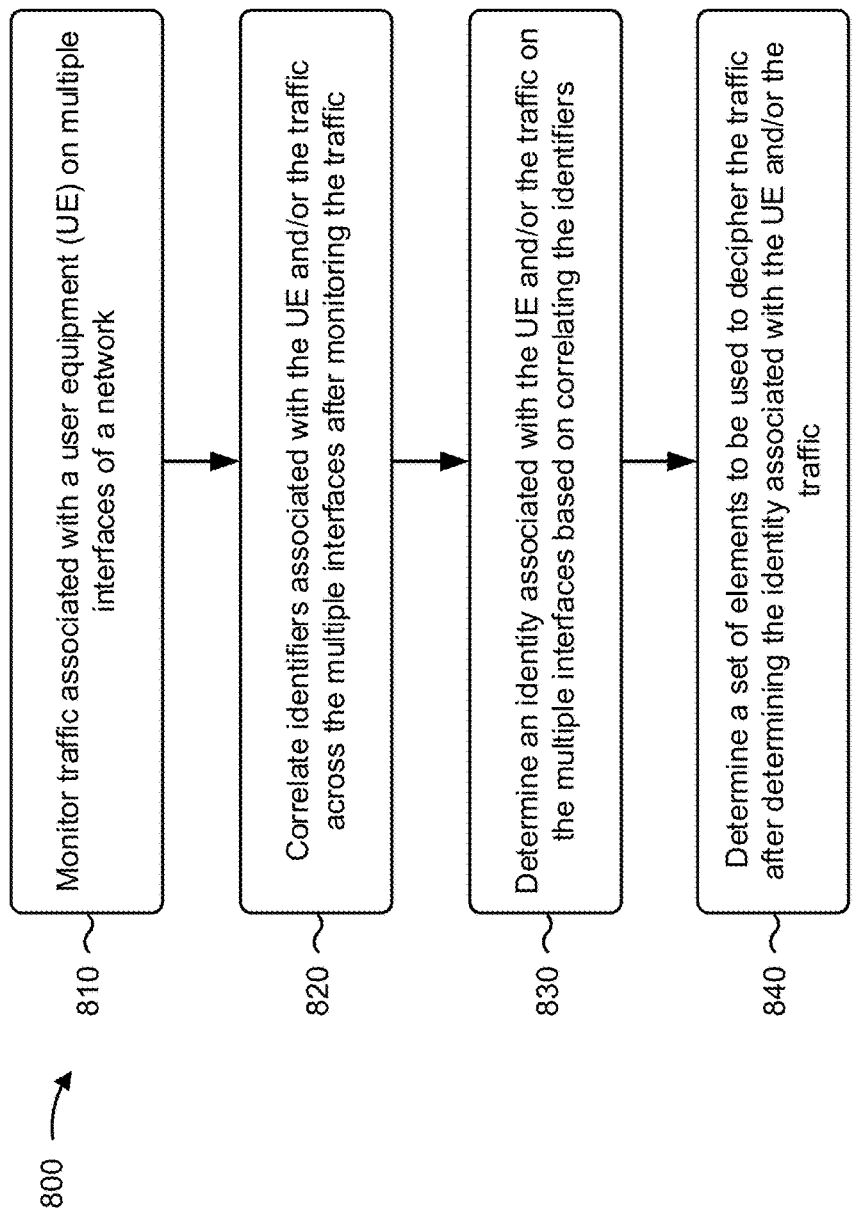

CROSS-INTERFACE CORRELATION OF TRAFFIC

RELATED APPLICATION

This application claims priority under 35 U.S.C. § 119 to U.S. Provisional Patent Application No. 62/591,490, filed on Nov. 28, 2017, the content of which is incorporated by reference herein in its entirety.

BACKGROUND

Within a network, interfaces may connect various components to or within the network. For example, in a long-term evolution (LTE) network, interfaces may permit a mobility management entity device (MME), a serving gateway (SGW), a packet data network gateway (PGW), and/or the like to communicate.

SUMMARY

According to some possible implementations, a method may include monitoring, by a device, traffic associated with a user equipment (UE) on multiple interfaces of a network. The method may include determining, by the device, an identity associated with the UE or the traffic on the multiple interfaces by correlating identifiers associated with the UE or the traffic across the multiple interfaces. The identity may uniquely identify a subscriber associated with the UE or the traffic. The method may include determining, by the device, a set of elements to be used to decipher the traffic after determining the identity associated with the UE or the traffic. The method may include deciphering, by the device, the traffic utilizing the set of elements after determining the set of elements.

According to some possible implementations, a device may include one or more memories; and one or more processors, communicatively coupled to the one or more memories, configured to monitor traffic associated with a user equipment (UE) on multiple interfaces of a network. The one or more processors may be configured to correlate identifiers associated with the UE or the traffic across the multiple interfaces after monitoring the traffic. The one or more processors may be configured to determine an identity associated with the UE or the traffic on the multiple interfaces based on correlating the identifiers. The identity may uniquely identify a subscriber associated with the UE or the traffic. The one or more processors may be configured to determine a set of elements to be used to decipher the traffic after determining the identity associated with the UE or the traffic. The one or more processors may be configured to decipher the traffic utilizing the set of elements after determining the set of elements.

According to some possible implementations, a non-transitory computer-readable medium may store one or more instructions that, when executed by one or more processors, may cause the one or more processors to monitor traffic associated with a user equipment (UE) on multiple interfaces of a network. The one or more instructions, when executed by the one or more processors, may cause the one or more processors to correlate identifiers associated with the UE or the traffic across the multiple interfaces after monitoring the traffic. The one or more instructions, when executed by the one or more processors, may cause the one or more processors to determine an identity associated with the UE or the traffic on the multiple interfaces based on correlating the identifiers. The identity may uniquely identify a subscriber associated with the UE or the traffic. The one or more instructions, when executed by the one or more processors, may cause the one or more processors to determine a set of elements to be used to decipher the traffic after determining the identity associated with the UE or the traffic.

BRIEF DESCRIPTION OF THE DRAWINGS

FIG. 8 is a flow chart of an example process for cross-interface correlation of traffic.

DETAILED DESCRIPTION

The following detailed description of example implementations refers to the accompanying drawings. The same reference numbers in different drawings may identify the same or similar elements.

Within a network (e.g., a long-term evolution (LTE) network, a cellular network, and/or the like) traffic on various interfaces associated with the network may be ciphered (e.g., ciphered using an encryption algorithm, encrypted, and/or the like). For example, traffic on a control plane and/or a user plane of the interfaces may be ciphered. While ciphering the traffic can protect a third party from reading the traffic, identifying a source of the traffic, a destination of the traffic, and/or the like, the ciphering can prevent a third party (e.g., a network operator) from performing services on the traffic (e.g., user-specific and/or network-related analytics and/or performance evaluation), performing trouble shooting on the traffic, and/or the like. In addition, different interfaces within a network may utilize different sets of identifiers for a source of traffic, a destination of traffic, and/or the like. This limits a capability of a third party to provide services to subscribers of a network, from improving network functioning via monitoring the network (e.g., to reduce computing resource and/or network resource consumption, to improve throughput of the network, and/or the like), and/or the like.

Some implementations described herein provide a traffic monitoring device that is capable of monitoring traffic on various interfaces associated with a network, determining a set of elements that have been used to cipher the traffic, and deciphering the traffic utilizing the set of elements. In this way, the traffic monitoring device facilitates real-time monitoring of device-specific traffic. This facilitates provisioning of additional services to devices within a network, thereby improving functioning of the network and/or the devices. In addition, this facilitates monitoring of analytics and/or a performance of a network and/or devices within the network, thereby facilitating faster identification of performance issues related to the network and/or the devices within the network. Further, this reduces or eliminates excess consumption of computing resources, network resources, and/or the like via improved monitoring of traffic exchanged among devices within a network.

Figure 1A:
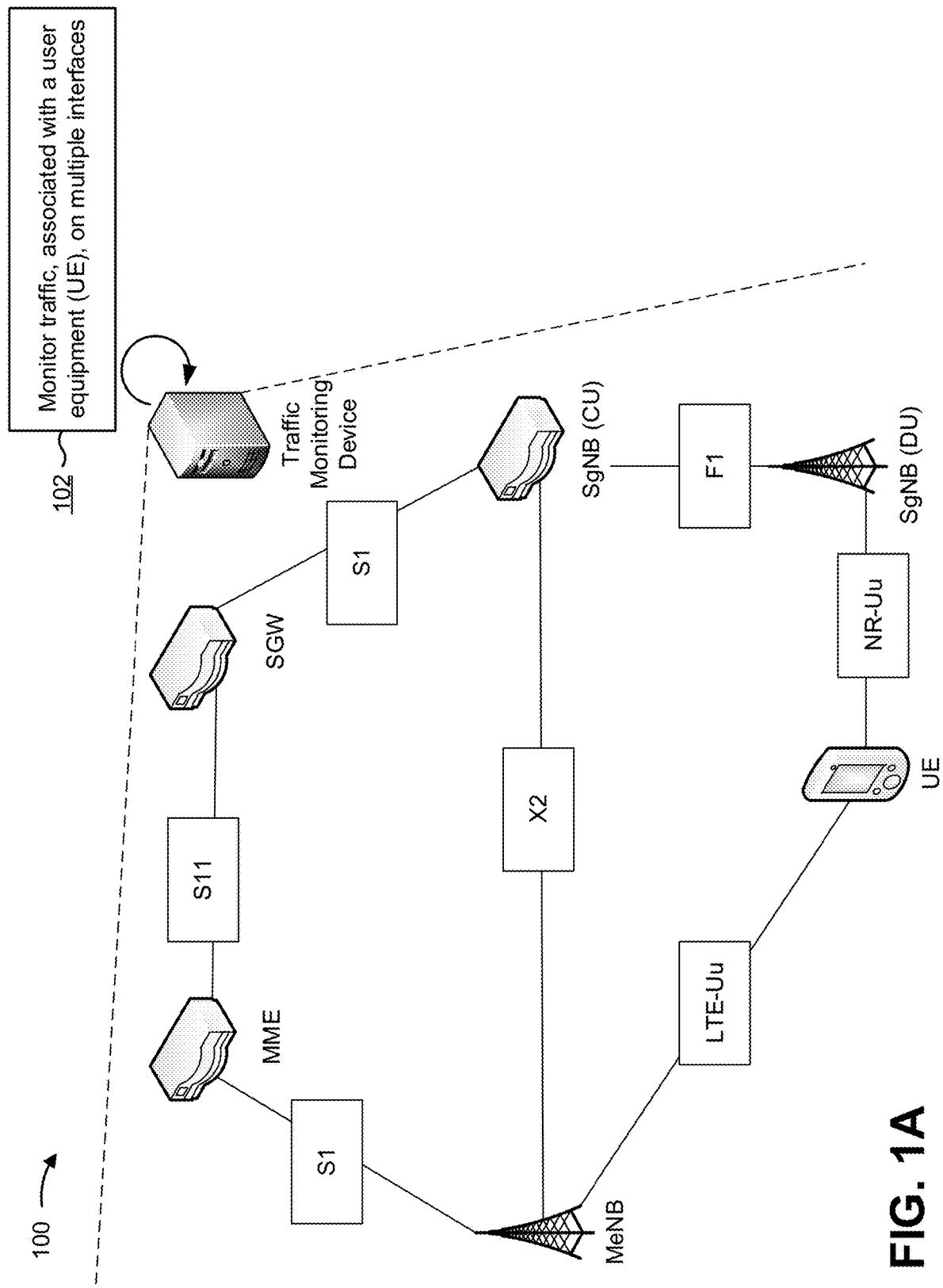
FIGS. 1A-1D are diagrams of an example implementation described herein.

FIGS. 1A-1D are diagrams of an example implementation 100 described herein. As shown in FIG. 1A, implementation 100 includes a traffic monitoring device, a mobility management entity device (MME), a serving gateway (SGW), a set of base stations, shown as a master evolved node B (MeNB) (e.g., a 4G MeNB), a secondary next generation node B (SgNB) central unit (CU) (e.g., a 5G SgNB (CU)), and an SgNB distributed unit (DU) (e.g., a 5G SgNB (DU)), and a user equipment (UE). In addition, FIG. 1A shows various interfaces between devices of implementation 100. For example, the interfaces may include a third generation partnership project (3GPP) LTE-Uu interface, a 3GPP new radio (NR) Uu interface (NR-Uu), a 3GPP F1 interface, a 3GPP X2 interface, multiple 3GPP S1 interfaces, and a 3GPP S11 interface.

As shown by reference number 102, the traffic monitoring device may monitor traffic, associated with a UE, on multiple interfaces. For example, the traffic monitoring device may monitor the traffic in real-time, based on receiving a copy of the traffic from one or more of the other devices associated with implementation 100, based on receiving a copy of the traffic from an application installed on one or more of the other devices associated with implementation 100, based on requesting the traffic, and/or the like. In some implementations, the traffic monitoring device may not receive contents of the traffic (e.g., a body of a communication), but rather may receive metadata associated with the traffic (e.g., information that can be used to identify a source of the traffic, a destination of the traffic, a network services subscriber associated with the traffic, and/or the like). This maintains a privacy of the traffic that could otherwise be compromised via receipt of contents of the traffic.

In some implementations, the traffic may be ciphered (e.g., encrypted, protected, and/or the like). For example, the traffic may be ciphered utilizing an encryption algorithm, such as a 5G/New Radio (NR) encryption algorithm (NEA) by a SgNB utilizing a S-KgNB, or an evolved packet system (EPS) encryption algorithm (EEA) by a MeNB utilizing a KeNB. In some implementations, the traffic monitoring device may not monitor traffic between the UE and a set of base stations. For example, the traffic monitoring device may not monitor traffic between the UE and the MeNB (e.g., on the LTE-Uu interface) and/or between the UE and the SgNB (DU) (e.g., on the NR-Uu interface). In this way, the traffic monitoring device does not monitor traffic directly to and/or from the UE. This reduces or eliminates interruptions to communications between the UE and a base station that could occur if the traffic monitoring device monitored traffic directly to and/or from the UE. In addition, this improves a privacy of the traffic. In some implementations, traffic on different interfaces may utilize different identifiers to identify the UE, an account associated with the UE and/or the traffic, a subscriber associated with the traffic and/or the UE, and/or the like. In some implementations, some of the identifiers used on the different interfaces may not uniquely identify the UE, the account, the subscriber, and/or the like.

Figure 1B:
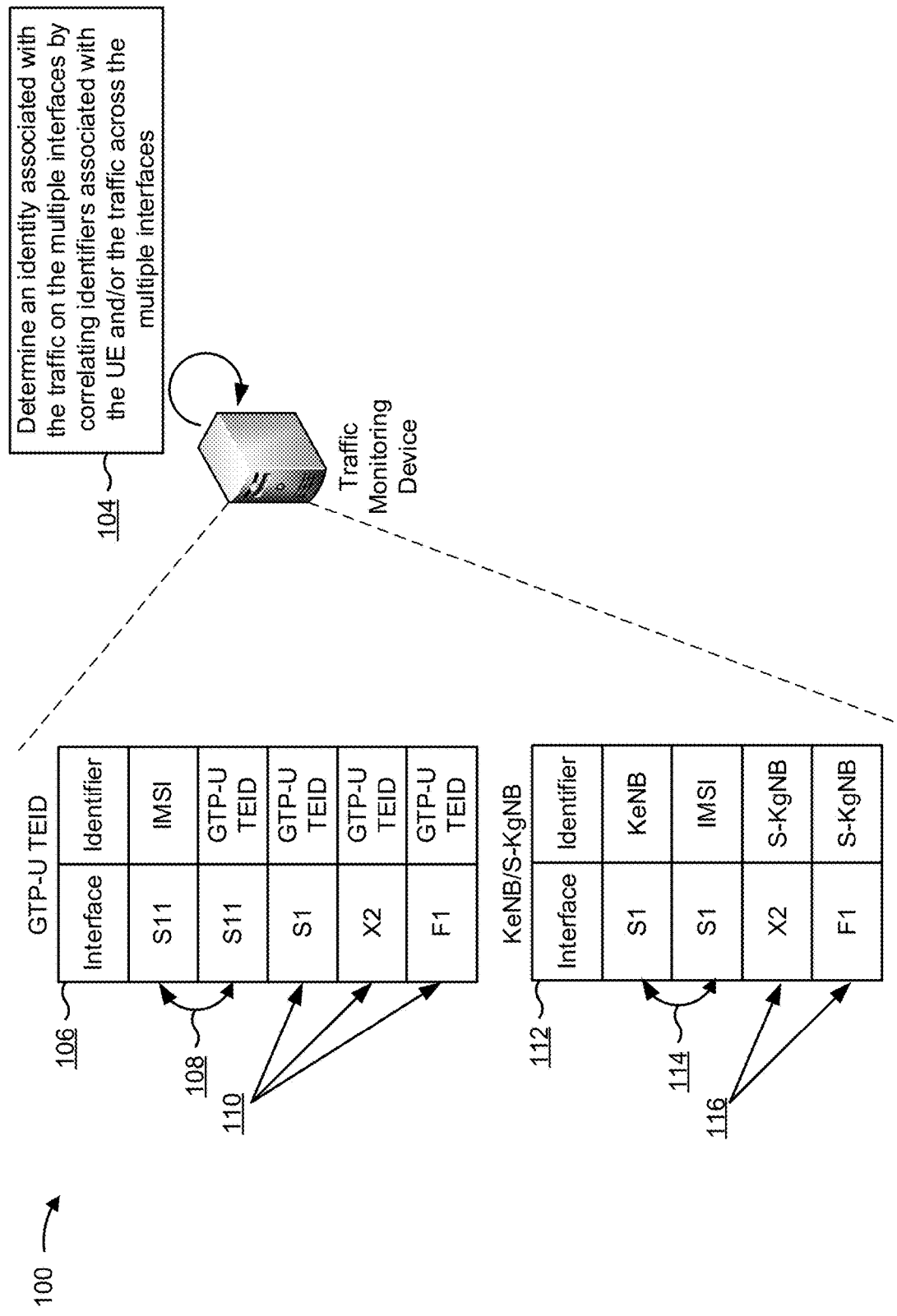

Turning to FIG. 1B, and as shown by reference number 104, the traffic monitoring device may determine an identity associated with the traffic on the multiple interfaces by correlating identifiers associated with the UE and/or the traffic across the multiple interfaces. For example, the traffic monitoring device may correlate different identifiers used on different interfaces in association with the traffic. Continuing with the previous example, a network may utilize a first identifier to identify the UE on a first interface, and may utilize a second identifier to identify the UE on a second interface, and the traffic monitoring device may correlate the first identifier and the second identifier so that the traffic can be associated with a UE, an account, a subscriber, and/or the like regardless of the identifier utilized. In some implementations, an identity may uniquely identify the UE, a subscriber associated with the UE and/or the traffic, an account associated with the UE and/or the traffic, and/or the like. For example, the identity may be based on an international mobile subscriber identity (IMSI), an international mobile equipment identity (IMEI), and/or the like.

As shown by reference number 106, the traffic monitoring device may determine an identity based on a general packet radio service (GPRS) tunneling protocol user plane (GTP-U) tunnel endpoint identifier (TEID) (GTP-U TEID). For example, and as shown by reference number 108, the traffic monitoring device may correlate an IMSI and a GTP-U TEID on an S11 interface (e.g., both the IMSI and the GTP-U TEID may be used in association with traffic on the S11 interface). Continuing with the previous example, and as described in more detail elsewhere herein, signaling on the S11 interface may utilize both the IMSI and the GTP-U TEID in association with establishing a communications session for the UE. In this way, the traffic monitoring device may map traffic that utilizes a GTP-U TEID to an IMSI (e.g., to a UE, to an account, to a subscriber, and/or the like associated with the IMSI). In some implementations, the traffic monitoring device may store information in a data structure, in memory resources of the traffic monitoring device, and/or the like, that identifies a mapping of the GTP-U TEID and the IMSI.

As shown by reference number 110, based on correlating the GTP-U TEID and the IMSI on the S1 interface, the traffic monitoring device can identify an identity for traffic on one or more other interfaces. For example, the traffic monitoring device can map traffic on the S1 interface, the X2 interface, and/or the F1 interface to the same IMSI that was correlated with the GTP-U TEID on the S11 interface. In this way, the traffic monitoring device can determine an identity associated with traffic across multiple interfaces utilizing a GTP-U TEID (e.g., utilizing information that identifies a mapping of the GTP-U TEID and an IMSI).

As shown by reference number 112, the traffic monitoring device may determine an identity based on a master node key (KeNB) and a secondary node key (S-KgNB). For example, and as shown by reference number 114, the traffic monitoring device may correlate an IMSI and a KeNB on an S1 interface (e.g., both the IMSI and the KeNB may be used in association with traffic on the S1 interface). In this way, the traffic monitoring device may map traffic that utilizes a KeNB to an IMSI (e.g., to a UE, to an account, to a subscriber, and/or the like associated with the IMSI). In some implementations, the traffic monitoring device may store information in a data structure, in memory resources of the traffic monitoring device, and/or the like, that identifies a mapping of the KeNB and the IMSI.

As shown by reference number 116, the traffic monitoring device may utilize an S-KgNB to correlate traffic on one or more other interfaces with the IMSI. For example, an S-KgNB may be derived from a KeNB (e.g., via a known process). In some implementations, the traffic monitoring device may determine the S-KgNB that is expected on the one or more other interfaces based on the KeNB identified on the S1 interface. In some implementations, based on determining the S-KgNB, the traffic monitoring device may identify traffic that utilizes the S-KgNB as being associated with the IMSI. In this way, the traffic monitoring device may correlate traffic across multiple interfaces utilizing a KeNB and an S-KgNB.

Figure 1C:
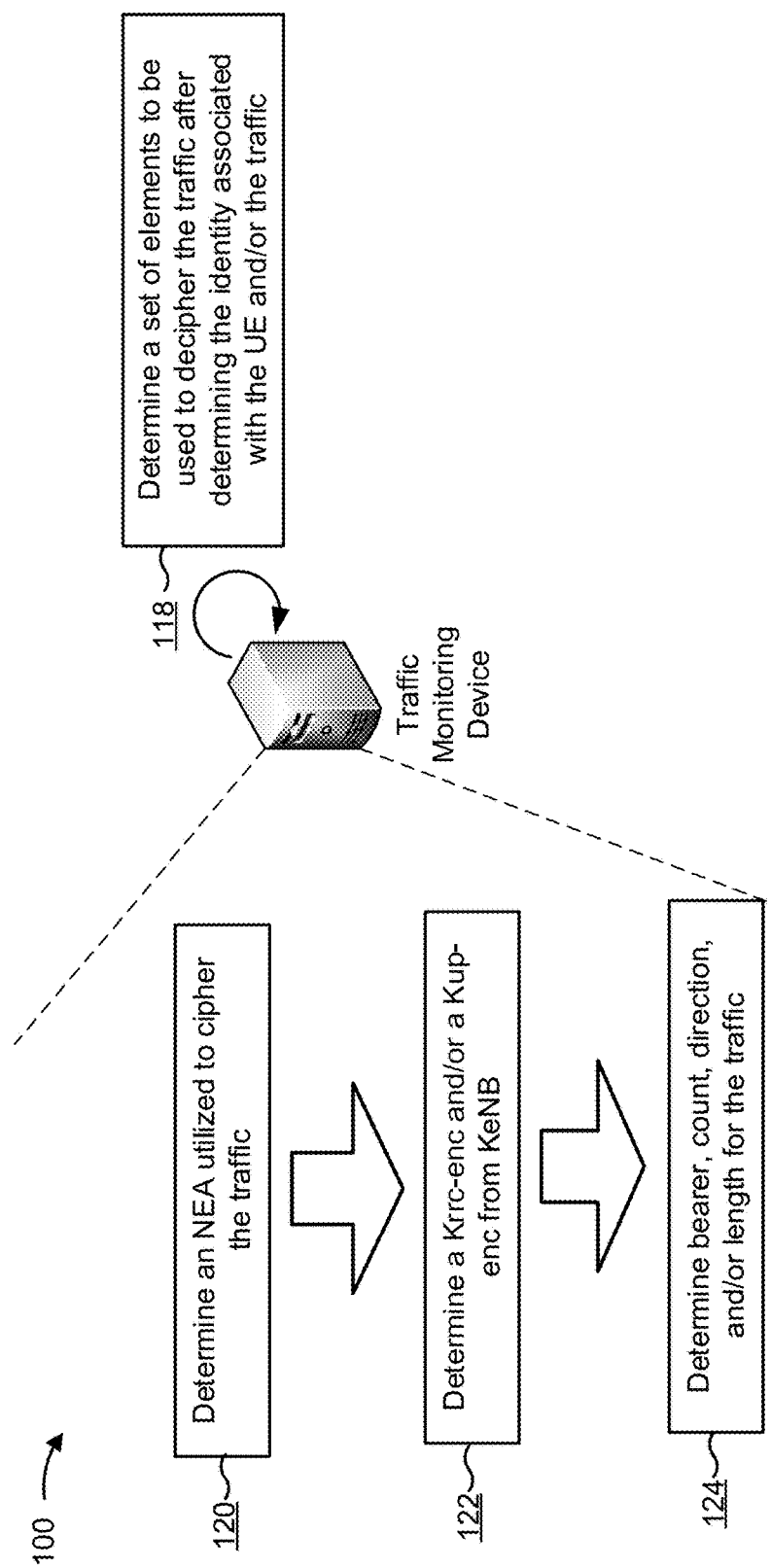

Turning to FIG. 1C, and as shown by reference number 118, the traffic monitoring device may determine a set of elements to be used to decipher the traffic after determining the identity associated with the UE and/or the traffic. For example, the set of elements may include an NEA or an EEA used to encrypt the traffic, a cipher key associated with the traffic, a bearer associated with the traffic, a count associated with the traffic, a direction associated with the traffic, and/or a length associated with the traffic. Continuing with the previous example, the traffic monitoring device may generate a security context for the traffic and/or for the UE associated with the traffic (e.g., a source of the traffic, a destination of the traffic, and/or the like) that permits deciphering of non-access stratum (NAS)-related information and/or radio resource control (RRC)-related information associated with the traffic. In some implementations, the traffic monitoring device may determine the set of elements from information included in the traffic (e.g., metadata associated with the traffic), based on the identity determined for the UE and/or the traffic (e.g., the IMSI), an identifier associated with the traffic (e.g., a GTP-U TEID, a KeNB, an S-KgNB, and/or the like).

As shown by reference number 120, the traffic monitoring device may determine an NEA or an EEA utilized to cipher the traffic. In some implementations, the traffic monitoring device may process the traffic to determine the NEA or the EEA utilized for the traffic. For example, the traffic monitoring device may process an RRC Reconfiguration and/or security mode command message to determine the NEA or the EEA utilized (e.g., the RRC Reconfiguration and/or security mode command message may include an identifier in a particular field associated with the RRC Reconfiguration and/or security mode command message that identifies a particular NEA or EEA utilized to cipher the traffic). As specific examples, a first identifier may identify the NEA or the EEA utilized as a RRC and user plane encryption algorithm (N-RRC-enc-alg and N-UP-enc-alg for a gNB, RRC-enc-alg and UP-enc-alg for an eNB), a second identifier may identify the 5G/NR integrity algorithm (NIA) utilized as an RRC integrity algorithm (N-RRC-int-alg for a gNB, RRC-int-alg for an eNB).

In some implementations, after determining an NEA or an EEA associated with the traffic, the traffic monitoring device may determine a set of cipher keys associated with the traffic and/or the NEA or the EEA. For example, and as shown by reference number 122, the traffic monitoring device may determine an RRC encryption key (Krrc-enc) and/or a user plane encryption key (Kup-enc) based on the S-KgNB or the KeNB associated with the traffic. In some implementations, to determine the Krrc-enc and/or the Kup-enc, the traffic monitoring device may utilize a hash-based message authentication code (HMAC). For example, the traffic monitoring device may utilize an HMAC secure hash algorithm (HMAC-SHA), such as an HMAC-SHA-1 cryptographic hash function, an HMAC-SHA-2 cryptographic function, an HMAC-SHA-3 cryptographic function, and/or the like. In some implementations, the particular HMAC that the traffic monitoring device needs to utilize may be based on the key to be determined. For example, to determine the Krrc-enc and/or the Kup-enc, the traffic monitoring device may utilize an HMAC-SHA-256.

In some implementations, the traffic monitoring device may utilize a set of variables as input to the HMAC. For example, the traffic monitoring device may utilize the S-KgNB or the KeNB as a first variable and another variable as a second variable as input to the HMAC. In some implementations, the second variable may be a function of one or more other variables. For example, the second variable may be a function of a function code (e.g., a 0x15 function code, a 0x11 function code, and/or the like), an algorithm type distinguisher, a length of the algorithm type distinguisher, an algorithm identity, a length of the algorithm identity, and/or the like. In some implementations, output from the HMAC may include the Krrc-enc and/or the Kup-enc. In this way, the traffic monitoring device may determine the Krrc-enc and/or the Kup-enc.

In some implementations, the traffic monitoring device may determine one or more other elements to be used to decipher the traffic. For example, and as shown by reference number 124, the traffic monitoring device may determine a bearer (e.g., a radio bearer), a count (e.g., an order of the traffic in relation to other traffic), a direction (e.g., uplink or downlink), and/or a length (e.g., a byte length) associated with the traffic. In some implementations, the traffic monitoring device may determine these elements from metadata associated with the traffic, based on monitoring the traffic, and/or the like. In this way, the traffic monitoring device may determine the set of elements related to deciphering the traffic.

Figure 1D:
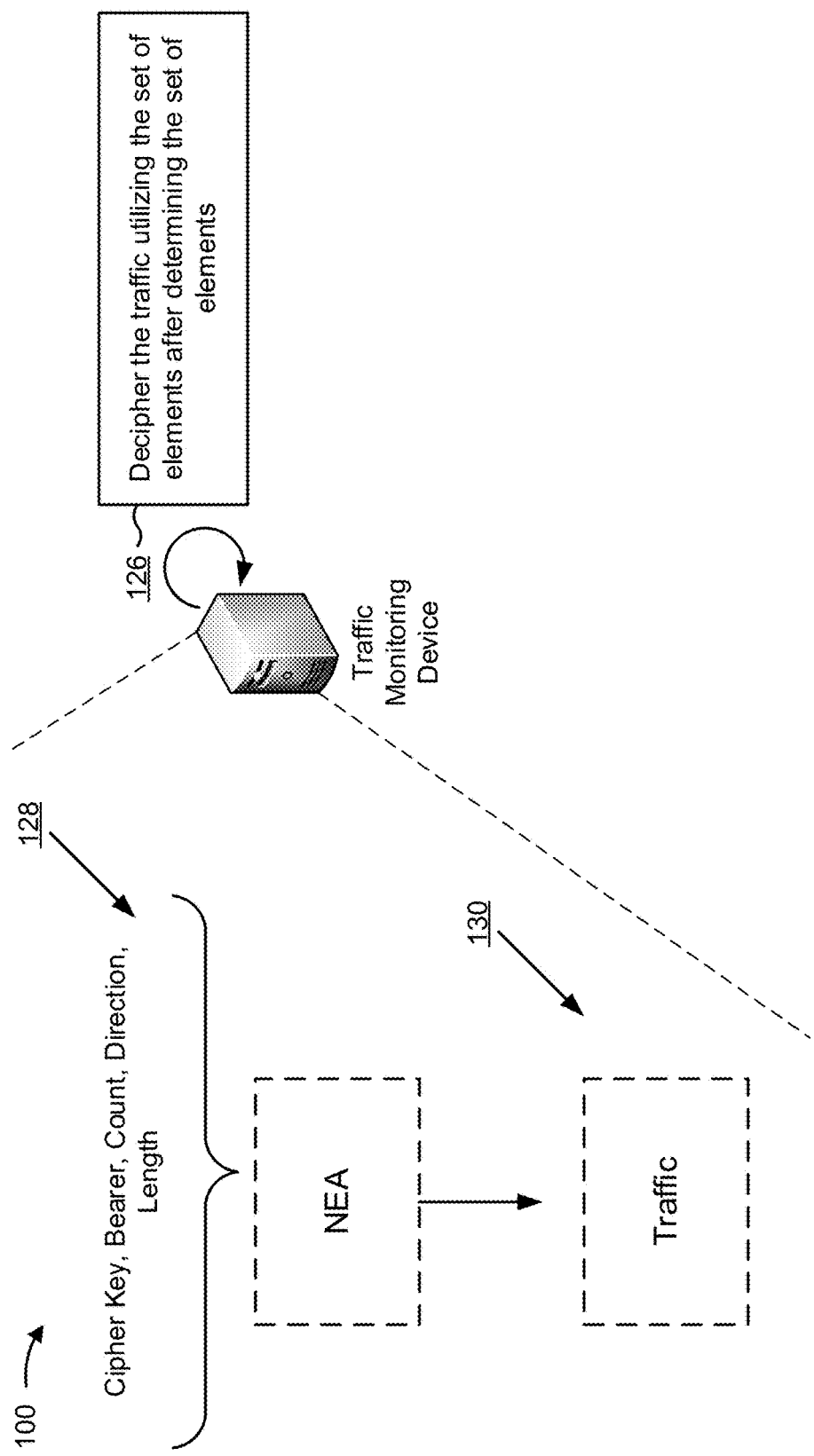

Turning to FIG. 1D, and as shown by reference number 126, the traffic monitoring device may decipher the traffic utilizing the set of elements after determining the set of elements. For example, the traffic monitoring device may decipher control plane signaling radio bearers (SRBs). Additionally, or alternatively, and as another example, the traffic monitoring device may decipher user plane data radio bearers (DRBs). In some implementations, and as shown by reference number 128, the traffic monitoring device may utilize the set of elements to decipher the traffic. For example, the traffic monitoring device may input the cipher key (e.g., the Krrc-enc and/or the Kup-enc), the bearer, the count, the direction, and/or the length into the NEA or the EEA. In some implementations, output from inputting the set of elements into the NEA or the EEA may include a keystream that can be utilized to decipher the traffic. As shown by reference number 130, the traffic monitoring device may decipher the traffic utilizing the keystream. For example, the traffic monitoring device may decipher the SRBs and/or the DRBs by processing the SRBs and/or the DRBs utilizing the keystream.

In some implementations, the traffic monitoring device may perform one or more other actions. In some implementations, the traffic monitoring device may perform analytics on the traffic (e.g., UE-specific analytics, interface-specific analytics, and/or the like). Additionally, or alternatively, the traffic monitoring device may generate a report related to the traffic and/or the analytics. Additionally, or alternatively, the traffic monitoring device may provide information related to the traffic for troubleshooting purposes (e.g., to a client device, a server device, and/or the like). Additionally, or alternatively, the traffic monitoring device may output information related to the traffic for display (e.g., via a client device associated with a network operator). For example, the traffic monitoring device may generate a report related to the traffic (e.g., that includes a result of analyzing the traffic), and may output the report for display via a client device.

In this way, the traffic monitoring device may correlate traffic across multiple interfaces and may decipher the traffic utilizing a determined cipher key. This facilitates traffic-related monitoring of metrics. In addition, this improves network functioning by facilitating troubleshooting and/or other services based on a UE, an account, a subscriber, and/or the like associated with the traffic. Further, this facilitates cross-interface provisioning of services, thereby improving network functioning.

As indicated above, FIGS. 1A-1D are provided merely as an example. Other examples are possible and may differ from what was described with regard to FIGS. 1A-1D.

Figure 2:
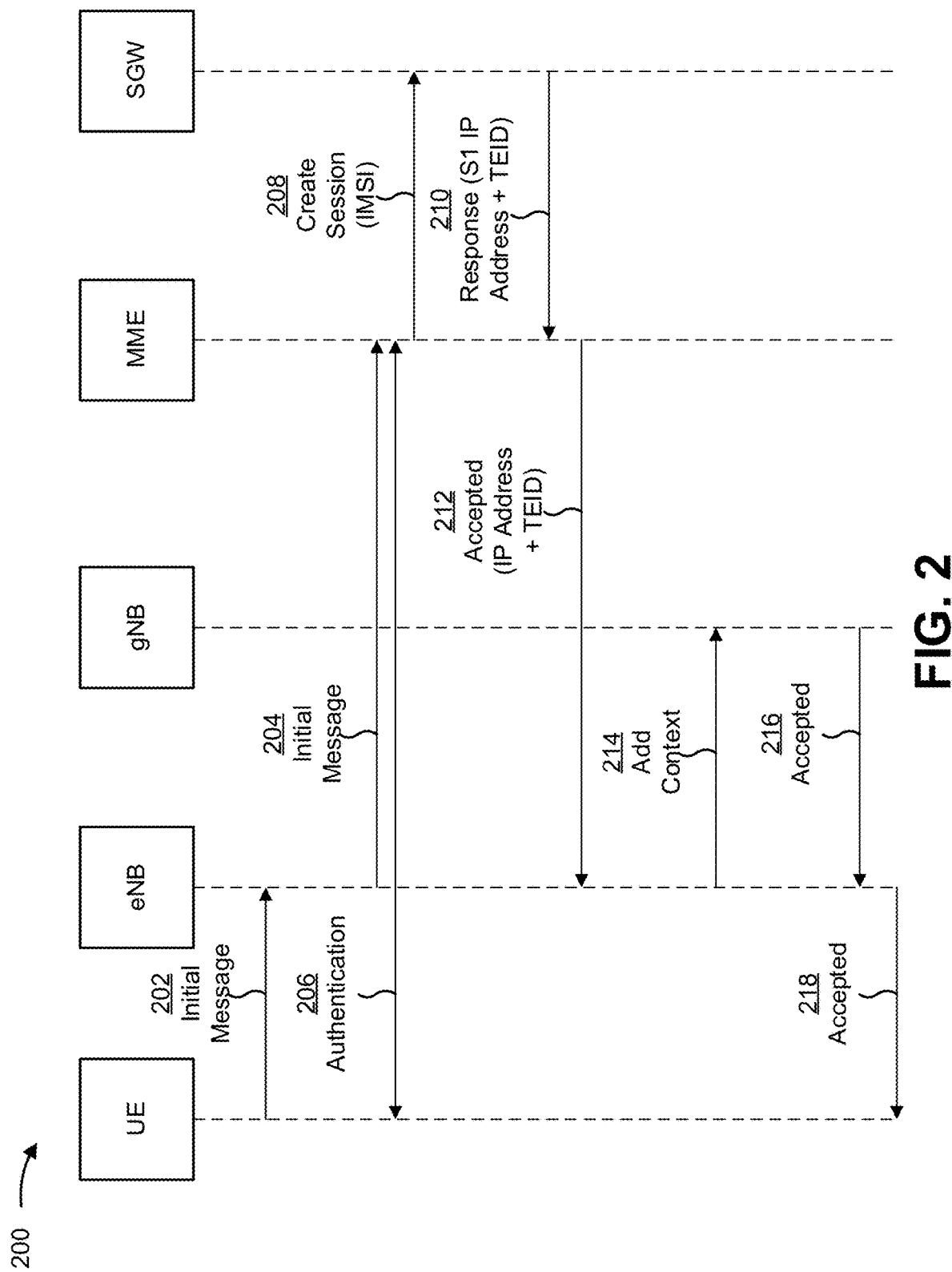
FIG. 2 is a call flow diagram of an example call flow for cross-interface correlation of traffic.

FIG. 2 is a call flow diagram of an example call flow 200 for cross-interference correlation of traffic. For example, FIG. 2 shows an example of correlating traffic across multiple interfaces utilizing a GTP-U TEID. As shown in FIG. 2, and by reference number 202, the UE may send an initial message to an eNB (e.g., the MeNB from FIGS. 1A-1D). The initial message may be associated with attachment of the UE to a network, establishment of a connection to the network, establishment of a communications session with the network, and/or the like. As shown by reference number 204, the eNB may provide the initial message to an MME. As shown by reference number 206, the MME may communicate with the UE to perform authentication of the UE.

As shown by reference number 208, the MME may communicate with an SGW to create a session (e.g., a communications session) for the UE utilizing an IMSI associated with the UE. As shown by reference number 210, the SGW may send a response to the MME that includes an S1 interface Internet protocol (IP) address for the UE and a GTP-U TEID for the UE. In some implementations, the traffic monitoring device may be monitoring this traffic and may identify the IMSI and the GTP-U TEID on the S11 interface between the MME and the SGW, thereby facilitating correlation of the GTP-U TEID with the IMSI.

As shown by reference number 212, the MME may send a message, indicating that the establishment of the session has been accepted, to the eNB. In some implementations, this message may include the IP address described above and the GTP-U TEID. As shown by reference number 214, the eNB may add a context (e.g., a security context) for the session by communicating with a gNB (e.g., the SgNB from FIGS. 1A-1D). As shown by reference number 216, the gNB may send a message to the eNB indicating that the addition of the context has been accepted. As shown by reference number 218, the eNB may send a message to the UE indicating that the session and/or the context has been accepted.

In this way, the traffic monitoring device may correlate multiple interfaces (e.g., an X2 interface, an F1 interface, and/or the like) using a GTP-U TEID and may then utilize the GTP-U TEID to correlate a session on the multiple interfaces with an IMSI. In addition, any temporary identifiers observed on the multiple interfaces can be mapped to the IMSI in a similar manner.

As indicated above, FIG. 2 is provided merely as an example. Other examples are possible and may differ from what was described with regard to FIG. 2.

Figure 3:
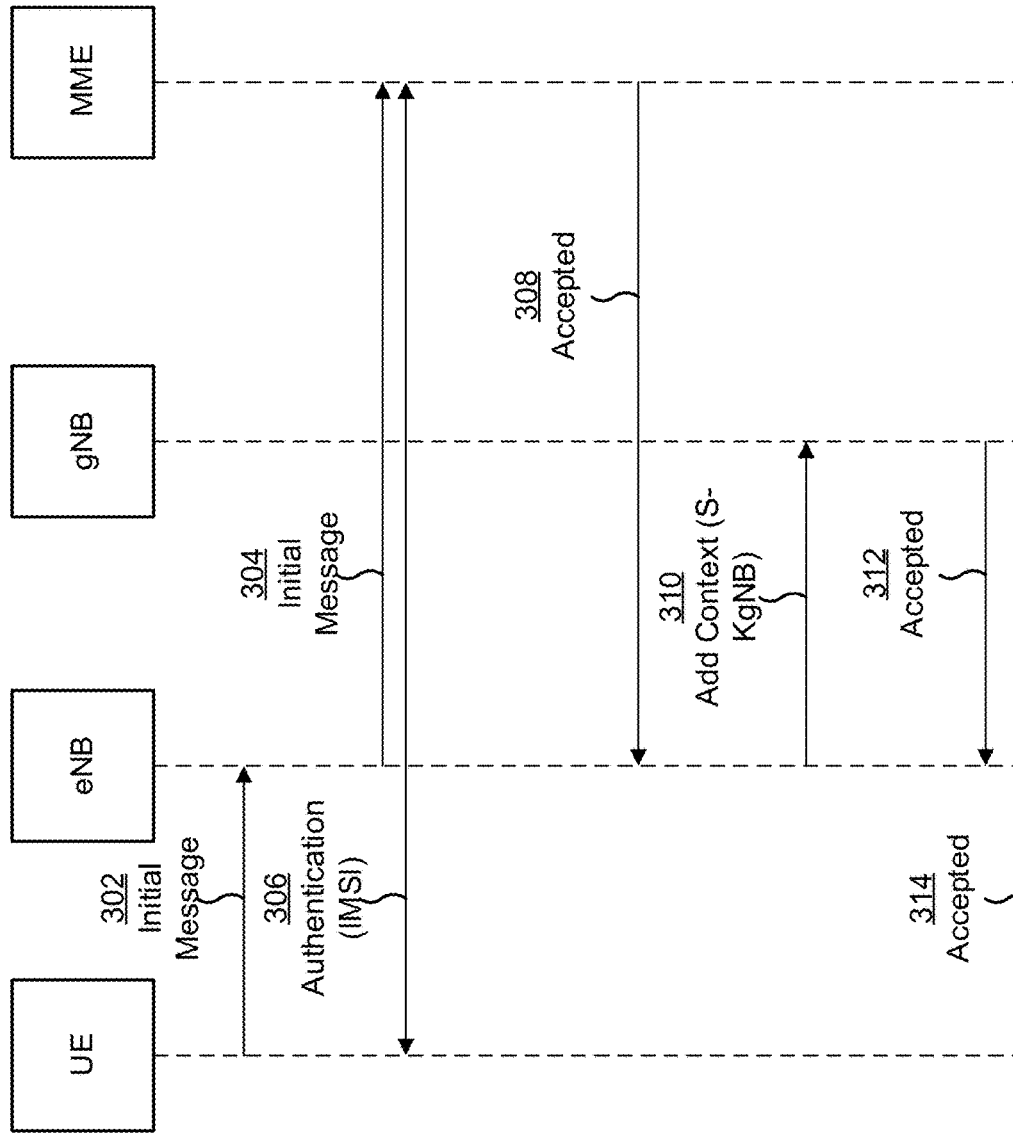
FIG. 3 is a call flow diagram of an example call flow for cross-interface correlation of traffic.

FIG. 3 is a call flow diagram of an example call flow 300 for cross-interface correlation of traffic. For example, FIG. 3 shows an example of correlating traffic across multiple interfaces utilizing a GTP-U TEID. As shown by reference number 302, a UE may send an initial message to an eNB (e.g., the MeNB from FIGS. 1A-1D), in a manner similar to that described elsewhere herein. As shown by reference number 304, the eNB may send the initial message to an MME. As shown by reference number 306, the MME and the UE may communicate to perform authentication of the UE (e.g., utilizing an IMSI associated with the UE). As shown by reference number 308, the MME may send a message to the eNB indicating that the MME has accepted the UE's initial message (e.g., utilizing a KeNB). In some implementations, the traffic monitoring device may derive the S-KgNB from the K-eNB, and utilize the S-KgNB to correlate communications with the IMSI, in a manner similar to that described elsewhere herein.

As shown by reference number 310, the eNB may add a context (e.g., a security context) to a communications session between the UE and a network (e.g., utilizing the S-KgNB) by communicating with a gNB (e.g., the SgNB from FIGS. 1A-1D). As shown by reference number 312, the gNB may send a message to the eNB indicating that the initial message from the UE has been accepted, that the context has been accepted, that the communications session has been accepted, and/or the like. As shown by reference number 314, the eNB may send a message to the UE indicating that the initial message has been accepted, that the context has been accepted, that the communications session has been accepted, and/or the like.

In this way, the traffic monitoring device can correlate an X2 and an F1 interface utilizing an S-KgNB and can associate an IMSI with communications on the X2 and the F1 interface. In addition, any temporary identifiers observed can be correlated to the IMSI in a similar manner.

As indicated above, FIG. 3 is provided merely as an example. Other examples are possible and may differ from what was described with regard to FIG. 3.

Figure 4:
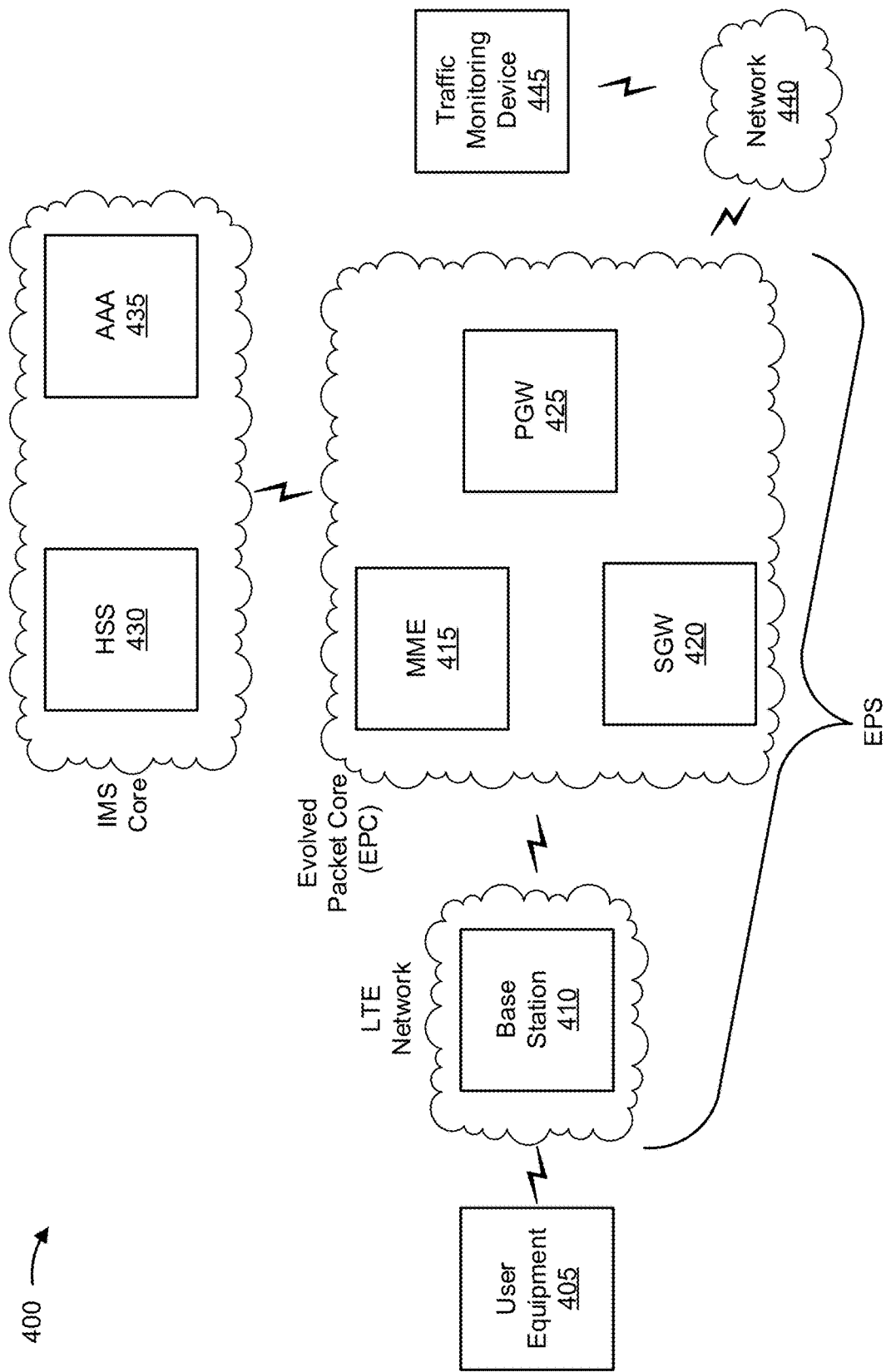
FIG. 4 is a diagram of an example environment in which systems and/or methods, described herein, may be implemented.

FIG. 4 is a diagram of an example environment 400 in which systems and/or methods, described herein, may be implemented. As shown in FIG. 4, environment 400 may include a user equipment 405, a base station 410, a mobility management entity device (MME) 415, a serving gateway (SGW) 420, a packet data network gateway (PGW) 425, a home subscriber server (HSS) 430, an authentication, authorization, and accounting server (AAA) 435, a network 440, and a traffic monitoring device (445). Devices of environment 400 may interconnect via wired connections, wireless connections, or a combination of wired and wireless connections.

Some implementations are described herein as being performed within a long term evolution (LTE) network for explanatory purposes. Some implementations can be performed within a network that is not an LTE network, such as a third generation (3G) network, a fourth generation (4G) network, a fifth generation (5G) network, etc.

Environment 400 includes an evolved packet system (EPS) that includes an LTE network and/or an evolved packet core (EPC) that operate based on a third generation partnership project (3GPP) wireless communication standard. The LTE network may include a radio access network (RAN) that includes one or more base stations 410 that take the form of evolved Node Bs (eNBs), next generation Node Bs (gNBs), and/or the like via which user equipment 405 communicates with the EPC. The EPC includes MME 415, SGW 420, and/or PGW 425 that enable user equipment 405 to communicate with network 440 and/or an Internet protocol (IP) multimedia subsystem (IMS) core. The IMS core may include HSS 430 and/or AAA 435, and can manage device registration and authentication, session initiation, etc., associated with user equipment 405. HSS 430 and/or AAA 435 can reside in the EPC and/or the IMS core.

User equipment 405 includes one or more devices capable of communicating with base station 410 and/or a network (e.g., network 440). For example, user equipment 405 may include a mobile phone (e.g., a smartphone or a radiotelephone), a laptop computer, a tablet computer, a gaming device, a wearable communication device (e.g., a smart wristwatch or a pair of smart eyeglasses), or a similar type of device. Although FIG. 4 shows a single user equipment 405, in practice, there can be hundreds, thousands, millions, etc. of user equipment 405 communicating with hundreds, thousands, millions, etc. of base stations 410, as described elsewhere herein.

Base station 410 includes one or more devices capable of transferring traffic, such as audio, video, text, and/or other traffic, destined for and/or received from user equipment 405. In some implementations, base station 410 may include an eNB, a gNB, and/or the like associated with the LTE network that receives traffic from and/or sends traffic to network 440 via SGW 420 and/or PGW 425. Additionally, or alternatively, one or more base stations 410 can be associated with a RAN that is not associated with the LTE network. Base station 410 can send traffic to and/or receive traffic from user equipment 405 via an air interface. In some implementations, base station 410 may include a small cell base station, such as a base station of a microcell, a picocell, and/or a femtocell.

MME 415 includes one or more devices, such as one or more server devices, capable of managing authentication, activation, deactivation, and/or mobility functions associated with user equipment 405. In some implementations, MME 415 can perform operations relating to authentication of user equipment 405. Additionally, or alternatively, MME 415 can facilitate the selection of a particular SGW 420 and/or a particular PGW 425 to serve traffic to and/or from user equipment 405. MME 415 can perform operations associated with handing off user equipment 405 from a first base station 410 to a second base station 410 when user equipment 405 is transitioning from a first cell associated with the first base station 410 to a second cell associated with the second base station 410. Additionally, or alternatively, MME 415 can select another MME (not pictured), to which user equipment 405 should be handed off (e.g., when user equipment 405 moves out of range of MME 415).

SGW 420 includes one or more devices capable of routing packets. For example, SGW 420 may include one or more data processing and/or traffic transfer devices, such as a gateway, a router, a modem, a switch, a firewall, a network interface card (NIC), a hub, a bridge, a server device, an optical add/drop multiplexer (OADM), or any other type of device that processes and/or transfers traffic. In some implementations, SGW 420 can aggregate traffic received from one or more base stations 410 associated with the LTE network, and can send the aggregated traffic to network 440 (e.g., via PGW 425) and/or other network devices associated with the EPC and/or the IMS core. SGW 420 can also receive traffic from network 440 and/or other network devices, and can send the received traffic to user equipment 405 via base station 410. Additionally, or alternatively, SGW 420 can perform operations associated with handing off user equipment 405 to and/or from an LTE network.

PGW 425 may include one or more devices capable of providing connectivity for user equipment 405 to external packet data networks (e.g., other than the depicted EPC and/or LTE network). For example, PGW 425 may include one or more data processing and/or traffic transfer devices, such as a gateway, a router, a modem, a switch, a firewall, a NIC, a hub, a bridge, a server device, an OADM, or any other type of device that processes and/or transfers traffic. In some implementations, PGW 425 can aggregate traffic received from one or more SGWs 420, and can send the aggregated traffic to network 440. Additionally, or alternatively, PGW 425 can receive traffic from network 440, and can send the traffic to user equipment 405 via SGW 420 and base station 410. PGW 425 can record data usage information (e.g., byte usage), and can provide the data usage information to AAA 435.

HSS 430 includes one or more devices, such as one or more server devices, capable of managing (e.g., receiving, generating, storing, processing, and/or providing) information associated with user equipment 405. For example, HSS 430 can manage subscription information associated with user equipment 405, such as information that identifies a subscriber profile of a user associated with user equipment 405, information that identifies services and/or applications that are accessible to user equipment 405, location information associated with user equipment 405, a network identifier (e.g., a network address) that identifies user equipment 405, information that identifies a treatment of user equipment 405 (e.g., quality of service information, a quantity of minutes allowed per time period, a quantity of data consumption allowed per time period, etc.), and/or similar information. HSS 430 can provide this information to one or more other devices of environment 400 to support the operations performed by those devices.

AAA 435 includes one or more devices, such as one or more server devices, that perform authentication, authorization, and/or accounting operations for communication sessions associated with user equipment 405. For example, AAA 435 can perform authentication operations for user equipment 405 and/or a user of user equipment 405 (e.g., using one or more credentials), can control access, by user equipment 405, to a service and/or an application (e.g., based on one or more restrictions, such as time-of-day restrictions, location restrictions, single or multiple access restrictions, read/write restrictions, etc.), can track resources consumed by user equipment 405 (e.g., a quantity of voice minutes consumed, a quantity of data consumed, etc.), and/or can perform similar operations.

Network 440 includes one or more wired and/or wireless networks. For example, network 440 may include a cellular network (e.g., a long-term evolution (LTE) network, a code division multiple access (CDMA) network, a 3G network, a 4G network, a 5G network, or another type of cellular network), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

Traffic monitoring device 445 includes one or more devices capable of monitoring traffic on various interfaces associated with a network, determining a set of elements that have been used to cipher the traffic, and deciphering the traffic utilizing the set of elements. For example, traffic monitoring device 445 may include a server (e.g., in a data center or a cloud computing environment), a data center (e.g., a multi-server micro datacenter), a workstation computer, a virtual machine (VM) provided in a cloud computing environment, or a similar type of device. In some implementations, traffic monitoring device 445 may be a physical device implemented within a housing, such as a chassis. In some implementations, traffic monitoring device 445 may be a virtual device implemented by one or more computer devices of a cloud computing environment or a data center.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5:
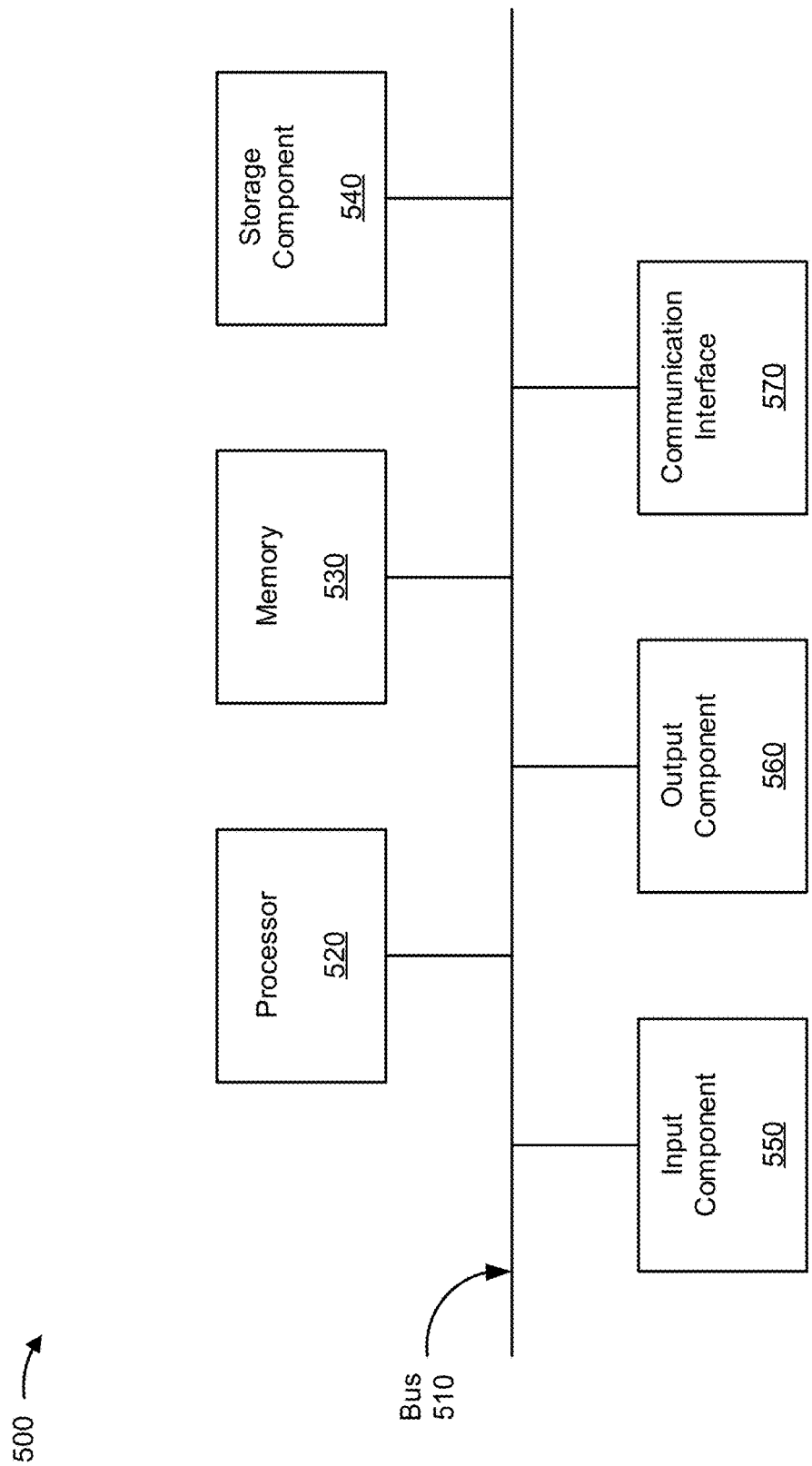
FIG. 5 is a diagram of example components of one or more devices of FIG. 2.

FIG. 5 is a diagram of example components of a device 500. Device 500 may correspond to user equipment 405, base station 410, MME 415, SGW 420, PGW 425, HSS 430, AAA 435, and/or traffic monitoring device 445. In some implementations, user equipment 405, base station 410, MME 415, SGW 420, PGW 425, HSS 430, AAA 435 and/or traffic monitoring device 445 may include one or more devices 500 and/or one or more components of device 500. As shown in FIG. 5, device 500 may include a bus 510, a processor 520, a memory 530, a storage component 540, an input component 550, an output component 560, and a communication interface 570.

Bus 510 includes a component that permits communication among the components of device 500. Processor 520 is implemented in hardware, firmware, or a combination of hardware and software. Processor 520 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 520 includes one or more processors capable of being programmed to perform a function. Memory 530 includes a random access memory (RAM), a read only memory (ROM), and/or another type of dynamic or static storage device (e.g., a flash memory, a magnetic memory, and/or an optical memory) that stores information and/or instructions for use by processor 520.

Storage component 540 stores information and/or software related to the operation and use of device 500. For example, storage component 540 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 550 includes a component that permits device 500 to receive information, such as via user input (e.g., a touch screen display, a keyboard, a keypad, a mouse, a button, a switch, and/or a microphone). Additionally, or alternatively, input component 550 may include a sensor for sensing information (e.g., a global positioning system (GPS) component, an accelerometer, a gyroscope, and/or an actuator). Output component 560 includes a component that provides output information from device 500 (e.g., a display, a speaker, and/or one or more light-emitting diodes (LEDs)).

Communication interface 570 includes a transceiver-like component (e.g., a transceiver and/or a separate receiver and transmitter) that enables device 500 to communicate with other devices, such as via a wired connection, a wireless connection, or a combination of wired and wireless connections. Communication interface 570 may permit device 500 to receive information from another device and/or provide information to another device. For example, communication interface 570 may include an Ethernet interface, an optical interface, a coaxial interface, an infrared interface, a radio frequency (RF) interface, a universal serial bus (USB) interface, a Wi-Fi interface, a cellular network interface, or the like.

Device 500 may perform one or more processes described herein. Device 500 may perform these processes based on processor 520 executing software instructions stored by a non-transitory computer-readable medium, such as memory 530 and/or storage component 540. A computer-readable medium is defined herein as a non-transitory memory device. A memory device includes memory space within a single physical storage device or memory space spread across multiple physical storage devices.

Software instructions may be read into memory 530 and/or storage component 540 from another computer-readable medium or from another device via communication interface 570. When executed, software instructions stored in memory 530 and/or storage component 540 may cause processor 520 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 5 are provided as an example. In practice, device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

Figure 6:
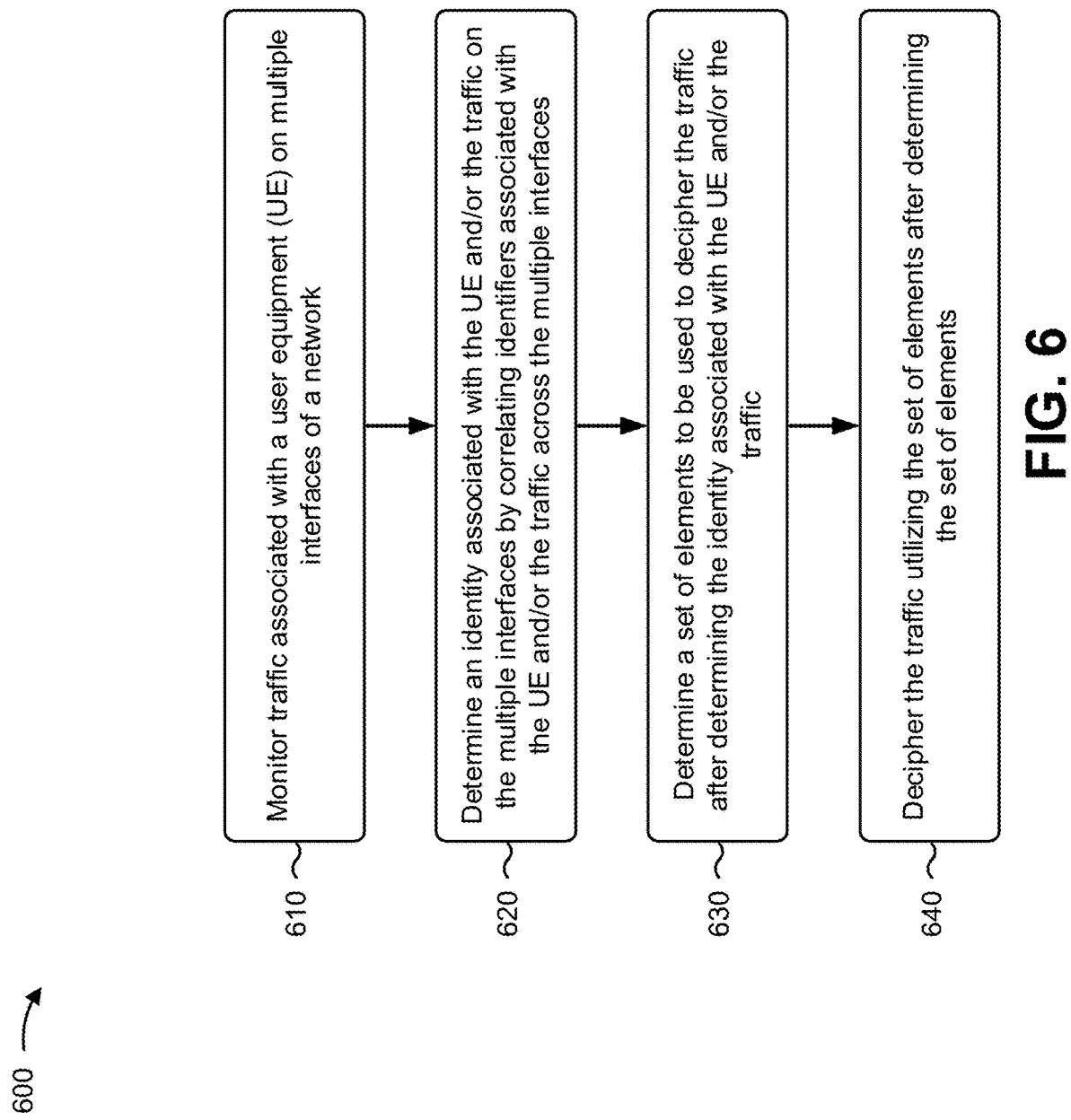
FIG. 6 is a flow chart of an example process for cross-interface correlation of traffic.

FIG. 6 is a flow chart of an example process 600 for cross-interface correlation of traffic. In some implementations, one or more process blocks of FIG. 6 may be performed by a traffic monitoring device (e.g., traffic monitoring device 445). In some implementations, one or more process blocks of FIG. 6 may be performed by another device or a group of devices separate from or including the traffic monitoring device, such as a user equipment (e.g., user equipment 405), a base station (e.g., base station 410), an MME (e.g., MME 415), an SGW (e.g., SGW 420), a PGW (e.g., PGW 425), an HSS (e.g., HSS 430), and/or an AAA (e.g., AAA 435).

As shown in FIG. 6, process 600 may include monitoring traffic associated with a user equipment (UE) on multiple interfaces of a network (block 610). For example, the traffic monitoring device (e.g., using processor 520, input component 550, communication interface 570, and/or the like) may monitor traffic associated with a UE on multiple interfaces of a network, in a manner that is the same as or similar to that described with regard to FIGS. 1A-1D.

As further shown in FIG. 6, process 600 may include determining an identity associated with the UE and/or the traffic on the multiple interfaces by correlating identifiers associated with the UE or the traffic across the multiple interfaces (block 620). For example, the traffic monitoring device (e.g., using processor 520, memory 530, storage component 540, and/or the like) may determine an identity associated with the UE and/or the traffic on the multiple interfaces by correlating identifiers associated with the UE and/or the traffic across the multiple interfaces, in a manner that is the same as or similar to that described with regard to FIGS. 1A-1D. In some implementations, the identity may uniquely identify a subscriber associated with the UE and/or the traffic.

As further shown in FIG. 6, process 600 may include determining a set of elements to be used to decipher the traffic after determining the identity associated with the UE and/or the traffic (block 630). For example, the traffic monitoring device (e.g., using processor 520, memory 530, storage component 540, and/or the like) may determine a set of elements to be used to decipher the traffic after determining the identity associated with the UE and/or the traffic, in a manner that is the same as or similar to that described with regard to FIGS. 1A-1D.

As further shown in FIG. 6, process 600 may include deciphering the traffic utilizing the set of elements after determining the set of elements (block 640). For example, the traffic monitoring device (e.g., using processor 520, memory 530, storage component 540, and/or the like) may decipher the traffic utilizing the set of elements after determining the set of elements, in a manner that is the same as or similar to that described with regard to FIGS. 1A-1D.

Process 600 may include additional implementations, such as any single implementation or any combination of implementations described below and/or in connection with one or more other processes described elsewhere herein.

In some implementations, the multiple interfaces may include a third generation partnership project (3 GPP) F1 interface, a 3 GPP S1 interface, a 3 GPP S11 interface, and/or a 3GPP X2 interface. In some implementations, the set of elements may include an evolved packet system (EPS) encryption algorithm (EEA) or a 5G/New Radio (NR) encryption algorithm (NEA) used to encrypt the traffic, a cipher key associated with the traffic, a bearer associated with the traffic, a count associated with the traffic, a direction associated with the traffic, and/or a length associated with the traffic.

In some implementations, traffic monitoring device may correlate an international mobile subscriber identity (IMSI) and a general packet radio service (GPRS) tunneling protocol user plane (GTP-U) tunnel endpoint identifier (TEID) (GTP-U TEID) on an interface of the multiple interfaces after monitoring the traffic. In some implementations, the traffic monitoring device may determine the identity associated with the UE and/or the traffic on the multiple interfaces based on correlating the IMSI and the GTP-U TEID on the interface.

In some implementations, the traffic monitoring device may correlate an international mobile subscriber identity (IMSI) and a master node key (KeNB) on an interface of the multiple interfaces, and may determine a secondary node key (S-KgNB), associated with the KeNB, on one or more other interfaces of the multiple interfaces after correlating the IMSI and the KeNB. In some implementations, the traffic monitoring device may determine the identity associated with the UE and/or the traffic on the multiple interfaces based on correlating the IMSI and the KeNB, and/or based on determining the S-KgNB.

In some implementations, the traffic monitoring device may determine a cipher key associated with the identity after determining the identity, and may store the cipher key in a memory resource of the device after determining the cipher key. In some implementations, the cipher key may be included in the set of elements. In some implementations, the traffic monitoring device may determine an evolved packet system (EPS) encryption algorithm (EEA) or a 5G/New Radio (NR) encryption algorithm (NEA) used to encrypt the traffic after determining the identity associated with the UE or the traffic, may determine a set of keys from a master node key (KeNB) or a secondary node key (S-KgNB) associated with the UE or the traffic after determining the NEA or the EEA used to encrypt the traffic, and/or may determine a bearer, a count, a direction, and/or a length associated with the traffic after determining the set of keys.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
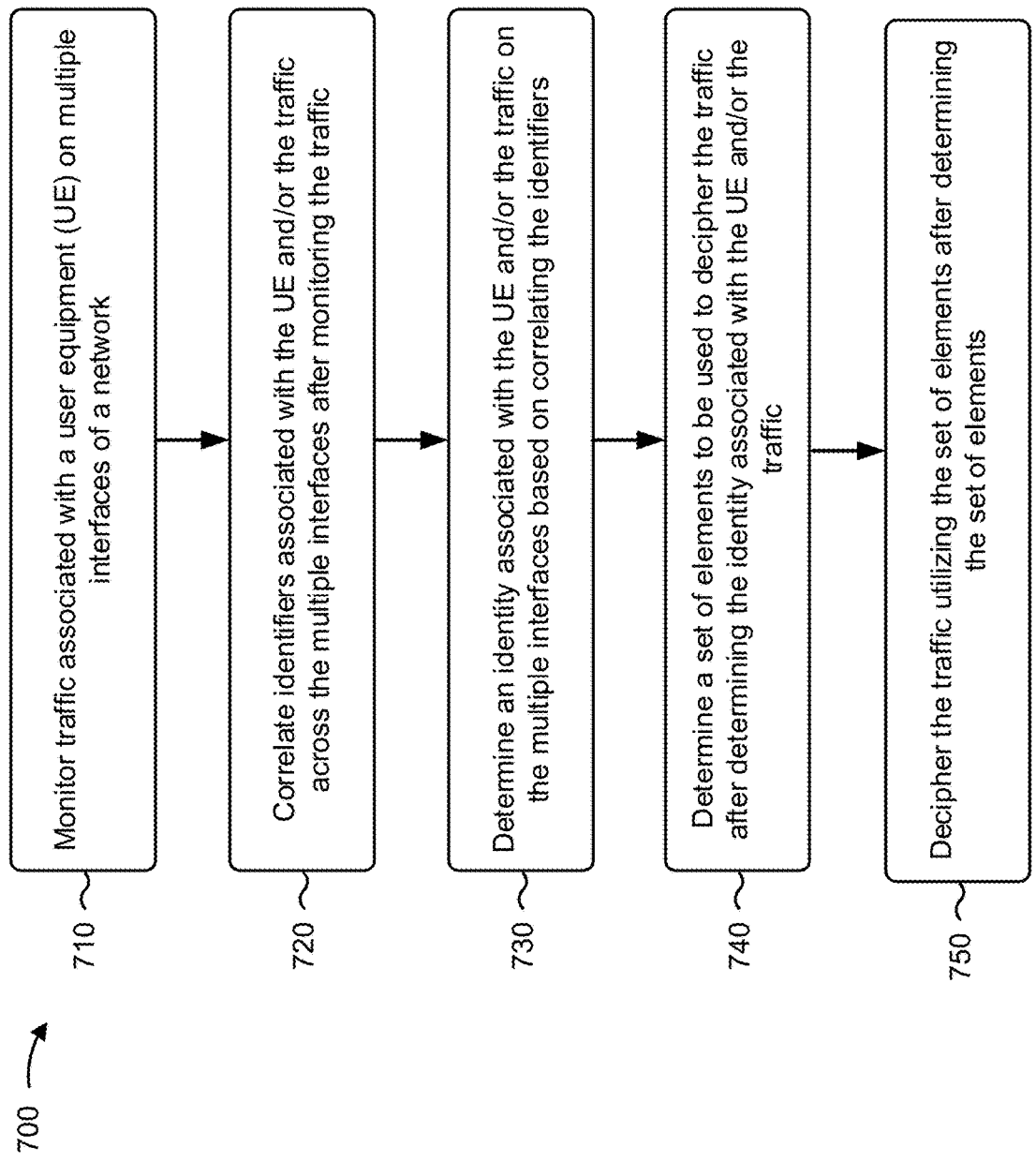
FIG. 7 is a flow chart of an example process for cross-interface correlation of traffic.

FIG. 7 is a flow chart of an example process 700 for cross-interface correlation of traffic. In some implementations, one or more process blocks of FIG. 7 may be performed by a traffic monitoring device (e.g., traffic monitoring device 445). In some implementations, one or more process blocks of FIG. 7 may be performed by another device or a group of devices separate from or including traffic monitoring device 445, such as a user equipment (e.g., user equipment 405), a base station (e.g., base station 410), an MME (e.g., MME 415), an SGW (e.g., SGW 420), a PGW (e.g., PGW 425), an HSS (e.g., HSS 430), and/or an AAA (e.g., AAA 435).

As shown in FIG. 7, process 700 may include monitoring traffic associated with a user equipment (UE) on multiple interfaces of a network (block 710). For example, the traffic monitoring device (e.g., using processor 520, memory 530, storage component 540, input component 550, communication interface 570, and/or the like) may monitor traffic associated with a UE on multiple interfaces of a network, in a manner that is the same as or similar to that described with regard to FIGS. 1A-1D.

As further shown in FIG. 7, process 700 may include correlating identifiers associated with the UE and/or the traffic across the multiple interfaces after monitoring the traffic (block 720). For example, the traffic monitoring device (e.g., using processor 520, memory 530, storage component 540, and/or the like) may correlate identifiers associated with the UE and/or the traffic across the multiple interfaces after monitoring the traffic, in a manner that is the same as or similar to that described with regard to FIGS. 1A-1D.

As further shown in FIG. 7, process 700 may include determining an identity associated with the UE and/or the traffic on the multiple interfaces based on correlating the identifiers (block 730). For example, the traffic monitoring device (e.g., using processor 520, memory 530, storage component 540, and/or the like) may determine an identity associated with the UE and/or the traffic on the multiple interfaces based on correlating the identifiers, in a manner that is the same as or similar to that described with regard to FIGS. 1A-1D. In some implementations, the identity may uniquely identify a subscriber associated with the UE or the traffic.

As further shown in FIG. 7, process 700 may include determining a set of elements to be used to decipher the traffic after determining the identity associated with the UE and/or the traffic (block 740). For example, the traffic monitoring device (e.g., using processor 520, memory 530, storage component 540, and/or the like) may determine a set of elements to be used to decipher the traffic after determining the identity associated with the UE and/or the traffic, in a manner that is the same as or similar to that described with regard to FIGS. 1A-1D.

As further shown in FIG. 7, process 700 may include deciphering the traffic utilizing the set of elements after determining the set of elements (block 750). For example, the traffic monitoring device (e.g., using processor 520, memory 530, storage component 540, and/or the like) may decipher the traffic utilizing the set of elements after determining the set of elements, in a manner that is the same as or similar to that described with regard to FIGS. 1A-1D.

Process 700 may include additional implementations, such as any single implementation or any combination of implementations described below and/or in connection with one or more other processes described elsewhere herein.

In some implementations, the traffic monitoring device may correlate an international mobile subscriber identity (IMSI) and a general packet radio service (GPRS) tunneling protocol user plane (GTP-U) tunnel endpoint identifier (TEID) across the multiple interfaces after monitoring the traffic. In some implementations, the traffic monitoring device may correlate an international mobile subscriber identity (IMSI) and a master node key (KeNB) on an interface of the multiple interfaces, and may correlate a secondary node key (S-KgNB) with the KeNB on one or more other interfaces, of the multiple interfaces, after correlating the IMSI and the KeNB.

In some implementations, the traffic monitoring device may input at least some of the set of elements into an evolved packet system (EPS) encryption algorithm (EEA) or a 5G/New Radio (NR) encryption algorithm (NEA) used to encrypt the traffic. In some implementations, the traffic monitoring device may determine the identity based on a general packet radio service (GPRS) tunneling protocol user plane (GTP-U) tunnel endpoint identifier (TEID). In some implementations, the traffic monitoring device may determine the identity based a master node key (KeNB) and/or a secondary node key (S-KgNB).

In some implementations, the multiple interfaces may include a first interface between a MME and a SGW associated with the network, a second interface between the MME and a first base station associated with the network, a third interface between the SGW and a second base station associated with the network, a fourth interface between the first base station and the second base station, and/or a fifth interface between the second base station and a third base station associated with the network.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

FIG. 8 is a flow chart of an example process 800 for cross-interface correlation of traffic. In some implementations, one or more process blocks of FIG. 8 may be performed by a traffic monitoring device (e.g., traffic monitoring device 445). In some implementations, one or more process blocks of FIG. 8 may be performed by another device or a group of devices separate from or including traffic monitoring device 445, such as a user equipment (e.g., user equipment 405), a base station (e.g., base station 410), an MME (e.g., MME 415), an SGW (e.g., SGW 420), a PGW (e.g., PGW 425), an HSS (e.g., HSS 430), and/or an AAA (e.g., AAA 435).

As shown in FIG. 8, process 800 may include monitoring traffic associated with a user equipment (UE) on multiple interfaces of a network (block 810). For example, the traffic monitoring device (e.g., using processor 520, memory 530, storage component 540, input component 550, communication interface 570, and/or the like) may monitor traffic associated with a UE on multiple interfaces of a network, in a manner that is the same as or similar to that described with regard to FIGS. 1A-1D.

As further shown in FIG. 8, process 800 may include correlating identifiers associated with the UE and/or the traffic across the multiple interfaces after monitoring the traffic (block 820). For example, the traffic monitoring device (e.g., using processor 520, memory 530, storage component 540, and/or the like) may correlate identifiers associated with the UE and/or the traffic across the multiple interfaces after monitoring the traffic, in a manner that is the same as or similar to that described with regard to FIGS. 1A-1D.

As further shown in FIG. 8, process 800 may include determining an identity associated with the UE and/or the traffic on the multiple interfaces based on correlating the identifiers (block 830). For example, the traffic monitoring device (e.g., using processor 520, memory 530, storage component 540, and/or the like) may determine an identity associated with the UE and/or the traffic on the multiple interfaces based on correlating the identifiers, in a manner that is the same as or similar to that described with regard to FIGS. 1A-1D. In some implementations, the identity may uniquely identify a subscriber associated with the UE or the traffic.

As further shown in FIG. 8, process 800 may include determining a set of elements to be used to decipher the traffic after determining the identity associated with the UE and/or the traffic (block 840). For example, the traffic monitoring device (e.g., using processor 520, memory 530, storage component 540, and/or the like) may determine a set of elements to be used to decipher the traffic after determining the identity associated with the UE and/or the traffic, in a manner that is the same as or similar to that described with regard to FIGS. 1A-1D.

Process 800 may include additional implementations, such as any single implementation or any combination of implementations described below and/or in connection with one or more other processes described elsewhere herein.

In some implementations, the traffic monitoring device may correlate a first identifier and a second identifier on a third generation partnership project (3GPP) S11 interface. In some implementations, the traffic monitoring device may correlate a first identifier and a second identifier on a third generation partnership project (3GPP) S1 interface.

In some implementations, the traffic monitoring device may decipher the traffic utilizing the set of elements after determining the set of elements. In some implementations, the traffic monitoring device may utilize the set of elements as input to an evolved packet system (EPS) encryption algorithm (EEA) or a 5G/New Radio (NR) encryption algorithm (NEA), and utilize a keystream, output by the EEA or the NEA, to decipher the traffic after utilizing the set of elements as the input to the EEA or the NEA. In some implementations, the traffic monitoring device may perform analytics on the traffic after deciphering the traffic.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

In this way, the traffic monitoring device facilitates UE-specific monitoring of ciphered traffic across multiple interfaces that utilize different identifiers for the UE and/or the traffic. This facilitates real-time monitoring of metrics and/or analytics related to the traffic and/or the UE, thereby facilitating faster identification of performance and/or network issues. In addition, this improves performance of a network by facilitating UE-specific and/or traffic-specific services.

Further, this provides a quick and efficient way to correlate traffic across multiple interfaces.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
    monitoring, by a device, traffic associated with a user equipment (UE) on multiple interfaces of a network;
    determining, by the device, an identity associated with the UE or the traffic on the multiple interfaces by correlating identifiers associated with the UE or the traffic across the multiple interfaces,
        wherein the identity uniquely identifies a subscriber associated with the UE or the traffic;
    determining, by the device, a set of elements to be used to decipher the traffic after determining the identity associated with the UE or the traffic,
        wherein the set of elements includes at least:
            a bearer associated with the traffic,
            a count associated with the traffic,
            a direction associated with the traffic, and
            a length associated with the traffic; and
    deciphering, by the device, the traffic utilizing the set of elements after determining the set of elements.

2. The method of claim 1, wherein the multiple interfaces include:
    a third generation partnership project (3GPP) F1 interface,
    a 3GPP S1 interface,
    a 3GPP S11 interface, or
    a 3GPP X2 interface.

3. The method of claim 1, wherein the set of elements further includes at least one of:
    an evolved packet system (EPS) encryption algorithm (EEA) or a 5G/New Radio (NR) encryption algorithm (NEA) used to encrypt the traffic, or
    a cipher key associated with the traffic.

4. The method of claim 1, further comprising:
    correlating an international mobile subscriber identity (IMSI) and a general packet radio service (GPRS) tunneling protocol user plane (GTP-U) tunnel endpoint identifier (TEID) (GTP-UTEID) on an interface of the multiple interfaces after monitoring the traffic; and
    wherein determining the identity associated with the UE or the traffic on the multiple interfaces comprises:
        determining the identity associated with the UE or the traffic on the multiple interfaces based on correlating the IMSI and the GTP-U TEID on the interface.

5. The method of claim 1, further comprising:
    correlating an international mobile subscriber identity (IMSI) and a master node key (KeNB) on an interface of the multiple interfaces;
    determining a secondary node key (S-KgNB), associated with the KeNB, on one or more other interfaces of the multiple interfaces after correlating the IMSI and the KeNB; and
    wherein determining the identity associated with the UE or the traffic on the multiple interfaces comprises:
        determining the identity associated with the UE or the traffic on the multiple interfaces based on:
            correlating the IMSI and the KeNB, or
            determining the S-KgNB.

6. The method of claim 1, further comprising:
    determining a cipher key associated with the identity after determining the identity,
        wherein the cipher key is included in the set of elements; and
    storing the cipher key in a memory resource of the device after determining the cipher key.

7. The method of claim 1, wherein determining the set of elements comprises:
    determining an evolved packet system (EPS) encryption algorithm (EEA) or a 5G/New Radio (NR) encryption algorithm (NEA) used to encrypt the traffic after determining the identity associated with the UE or the traffic;
    determining a set of keys from a master node key (KeNB) or a secondary node key (S-KgNB) associated with the UE or the traffic after determining the EEA or the NEA used to encrypt the traffic; and
    determining at least one of the bearer, the count, the direction, or the length associated with the traffic after determining the set of keys.

8. A device, comprising:
    one or more memories; and
    one or more processors, communicatively coupled to the one or more memories, configured to:
        monitor traffic associated with a user equipment (UE) on multiple interfaces of a network;
        correlate identifiers associated with the UE or the traffic across the multiple interfaces after monitoring the traffic;

determine an identity associated with the UE or the traffic on the multiple interfaces based on correlating the identifiers,
   wherein the identity uniquely identifies a subscriber associated with the UE or the traffic;
determine a set of elements to be used to decipher the traffic after determining the identity associated with the UE or the traffic
   wherein the set of elements includes at least:
      a bearer associated with the traffic,
      a count associated with the traffic,
      a direction associated with the traffic, and
      a length associated with the traffic; and
decipher the traffic utilizing the set of elements after determining the set of elements.

9. The device of claim 8, wherein the one or more processors, when correlating the identifiers, are configured to:
correlate an international mobile subscriber identity (IMSI) and a general packet radio service (GPRS) tunneling protocol user plane (GTP-U) tunnel endpoint identifier (TED) across the multiple interfaces after monitoring the traffic.

10. The device of claim 8, wherein the one or more processors, when correlating the identifiers, are configured to:
correlate an international mobile subscriber identity (IMSI) and a master node key (KeNB) on an interface of the multiple interfaces; and
correlate a secondary node key (S-KgNB) with the KeNB on one or more other interfaces, of the multiple interfaces, after correlating the IMSI and the KeNB.

11. The device of claim 8, wherein the one or more processors, when deciphering the traffic, are configured to:
decipher the traffic by inputting at least some of the set of elements into an evolved packet system (EPS) encryption algorithm (EEA) or a 5G/New Radio (NR) encryption algorithm (NEA) used to encrypt the traffic.

12. The device of claim 8, wherein the one or more processors, when determining the identity associated with the UE or the traffic, are configured to:
determine the identity based on a general packet radio service (GPRS) tunneling protocol user plane (GTP-U) tunnel endpoint identifier (TEID).

13. The device of claim 8, wherein the one or more processors, when determining the identity associated with the UE or the traffic, are configured to:
determine the identity based on at least one of:
   a master node key (KeNB), or
   a secondary node key (S-KgNB).

14. The device of claim 8, wherein the multiple interfaces include:
a first interface between a mobility management entity device (MME) and a serving gateway (SGW) associated with the network,
a second interface between the MME and a first base station associated with the network,
a third interface between the SGW and a second base station associated with the network,
a fourth interface between the first base station and the second base station, or
a fifth interface between the second base station and a third base station associated with the network.

15. A non-transitory computer-readable medium storing instructions, the instructions comprising:
one or more instructions that, when executed by one or more processors, cause the one or more processors to:
   monitor traffic associated with a user equipment (UE) on multiple interfaces of a network;
   correlate identifiers associated with the UE or the traffic across the multiple interfaces after monitoring the traffic;
   determine an identity associated with the UE or the traffic on the multiple interfaces based on correlating the identifiers,
      wherein the identity uniquely identifies a subscriber associated with the UE or the traffic; and
   determine a set of elements to be used to decipher the traffic after determining the identity associated with the UE or the traffic,
      wherein the set of elements includes at least:
         a bearer associated with the traffic,
         a count associated with the traffic,
         a direction associated with the traffic, and
         a length associated with the traffic.

16. The non-transitory computer-readable medium of claim 15, wherein the one or more instructions, that cause the one or more processors to correlate the identifiers, further cause the one or more processors to:
correlate a first identifier and a second identifier on a third generation partnership project (3GPP) S11 interface.

17. The non-transitory computer-readable medium of claim 15, wherein the one or more instructions, that cause the one or more processors to correlate the identifiers, cause the one or more processors to:
correlate a first identifier and a second identifier on a third generation partnership project (3GPP) S1 interface.

18. The non-transitory computer-readable medium of claim 15, wherein the one or more instructions, when executed by the one or more processors, further cause the one or more processors to:
decipher the traffic utilizing the set of elements after determining the set of elements.

19. The non-transitory computer-readable medium of claim 18, wherein the one or more instructions, that cause the one or more processors to decipher the traffic, cause the one or more processors to:
utilize the set of elements as input to an evolved packet system (EPS) encryption algorithm (EEA) or a 5G/New Radio (NR) encryption algorithm (NEA); and
utilize a keystream, output by the EEA or the NEA, to decipher the traffic after utilizing the set of elements as the input to the EEA or the NEA.

20. The non-transitory computer-readable medium of claim 18, wherein the one or more instructions, when executed by the one or more processors, further cause the one or more processors to:
perform analytics on the traffic after deciphering the traffic.

* * * * *